United States Patent
Zhu et al.

(10) Patent No.: US 11,089,520 B2
(45) Date of Patent: Aug. 10, 2021

(54) SESSION MIGRATION METHOD AND DEVICE

(71) Applicant: Huawei Technologies Co., Ltd., Shenzhen (CN)

(72) Inventors: Fangyuan Zhu, Beijing (CN); Yan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 64 days.

(21) Appl. No.: 16/577,518

(22) Filed: Sep. 20, 2019

(65) Prior Publication Data
US 2020/0015127 A1    Jan. 9, 2020

Related U.S. Application Data

(63) Continuation of application No. PCT/CN2017/077740, filed on Mar. 22, 2017.

(51) Int. Cl.
*H04W 36/00*      (2009.01)
*H04W 76/34*      (2018.01)

(52) U.S. Cl.
CPC ... *H04W 36/0016* (2013.01); *H04W 36/0027* (2013.01); *H04W 76/34* (2018.02)

(58) Field of Classification Search
CPC ......... H04W 36/0016; H04W 36/0027; H04W 36/0033; H04W 76/34
See application file for complete search history.

(56) References Cited

U.S. PATENT DOCUMENTS

| | | |
|---|---|---|
| 2014/0204909 A1 | 7/2014 | Cheng et al. |
| 2016/0212706 A1 | 7/2016 | Kahtava et al. |

(Continued)

FOREIGN PATENT DOCUMENTS

| | | |
|---|---|---|
| CA | 2879201 A1 | 4/2014 |
| CN | 101500271 A | 8/2009 |

(Continued)

OTHER PUBLICATIONS

3GPP TS 36.423 V12.3.0 (Sep. 2014); 3rd Generation Partnership Project; Technical Specification Group Radio Access Network; Evolved Universal Terrestrial Radio Access Network(E-UTRAN); X2 application protocol (X2AP)(Release 12); 153 pages.

(Continued)

*Primary Examiner* — Robert C Scheibel
(74) *Attorney, Agent, or Firm* — Slater Matsil, LLP

(57) ABSTRACT

Embodiments of this application provide a session migration method. The method includes: determining, by a source user plane network element, whether to continue to provide a service for a terminal device; and if yes, retaining, by the source user plane network element, a context of a first session, and sending a first notification message to a control plane network element, the first notification message is used to trigger the control plane network element to send instruction information to the terminal device, and the instruction information is used to instruct the terminal device to trigger establishment of a second session after data to be sent to the terminal device is obtained, the first session is an established session between the source user plane network element and the terminal device, and the second session is a session between a target user plane network element and the terminal device.

19 Claims, 13 Drawing Sheets

(56) References Cited

U.S. PATENT DOCUMENTS

| | | | |
|---|---|---|---|
| 2018/0220486 A1* | 8/2018 | Tseng .................... | H04W 76/27 |
| 2018/0270888 A1* | 9/2018 | Faccin .................. | H04W 76/20 |
| 2019/0116031 A1* | 4/2019 | Truchan ................. | H04L 63/06 |
| 2019/0174571 A1* | 6/2019 | Deenoo ................ | H04W 76/11 |
| 2019/0208500 A1* | 7/2019 | Jia ........................ | H04W 68/02 |
| 2019/0364475 A1* | 11/2019 | Chandramouli ...... | H04W 80/10 |
| 2020/0037210 A1* | 1/2020 | Rugeland .............. | H04W 12/08 |
| 2020/0296633 A1* | 9/2020 | Michalopoulos ... | H04W 36/023 |

FOREIGN PATENT DOCUMENTS

| | | | |
|---|---|---|---|
| CN | 101534495 A | 9/2009 | |
| CN | 102892210 A | 1/2013 | |
| CN | 104737619 A | 6/2015 | |
| WO | 2012152130 A1 | 11/2012 | |
| WO | 2016101974 A1 | 6/2016 | |
| WO | 2017023196 A1 | 2/2017 | |

OTHER PUBLICATIONS

3GPP TS 36.413 V12.3.0 (Sep. 2014); 3rd Generation Partnership Project; Technical Specification Group Radio Access Network; Evolved Universal Terrestrial Radio Access Network(E-UTRAN); S1 Application Protocol (S1AP) (Release 12); 290 pages.

Nokia, Alcatel-Lucent Shanghai Bell, "Update to solution 6.4.8," SA WG2 Meeting #116bis, S2-165119, was S2-164654, Aug. 29-Sep. 2, 2016, Sanya, China, 15 pages.

\* cited by examiner

SESSION MIGRATION METHOD AND DEVICE

CROSS-REFERENCE TO RELATED APPLICATIONS

This application is a continuation of International Application No. PCT/CN2017/077740, filed on Mar. 22, 2017, the disclosure of which is hereby incorporated by reference in its entirety.

TECHNICAL FIELD

Embodiments of this application relate to the field of communications technologies, and in particular, to a session migration method and a device.

BACKGROUND

With rapid development of communications technologies, a next generation wireless communications system such as a narrowband internet of things (NB-IoT) system emerges. In the next generation wireless communications system, small data may be transmitted between a terminal device and a core network device, and a service for transmitting the small data is usually referred to as a small packet service. The small packet service has relatively low requirements on both a delay and quality of service (QoS). Therefore, a continuous session does not need to be always maintained between the terminal device and the core network device.

In the prior art, for a terminal device, if a first session is established between the terminal device and both a control plane network element of a core network device and a source user plane network element of the core network device, uplink data from the terminal device is transmitted by using a radio access network device and the source user plane network element that provide a service for the terminal device. In a data transmission process, if the source user plane network element determines, based on a load status of the source user plane network element or a current data transmission path, not to continue to provide a service for the terminal device, the source user plane network element sends a notification message to the control plane network element, to instruct the control plane network element to release the first session. The control plane network element may immediately release the first session, and instruct the terminal device to re-send a session establishment request to the control plane network element. In this way, the control plane network element may select a new user plane network element for the terminal device, where the newly selected user plane network element is referred to as a target user plane network element, to establish a second session between the terminal device and both the control plane network element and the target user plane network element, so that the terminal device can transmit data from the terminal device by using the target user plane network element.

However, in the method, the first session is released before the second session is established. Therefore, a packet loss may occur in downlink data to be sent to the terminal device. In addition, the second session is established after the first session is released, and if the terminal device does not transmit data based on the second session, a core network resource is wasted, and unnecessary signaling transmission is performed.

SUMMARY

This application provides a session migration method and a device, so as to ensure that a packet loss does not occur in downlink data after a source user plane network element no longer continues to provide a service for a terminal device, and waste of core network resources and signaling transmission can be reduced.

To achieve the foregoing objective, the following technical solutions are used in this application.

According to a first aspect, a session migration method is provided, including: determining, by a source user plane network element, whether to continue to provide a service for a terminal device; and if determining not to continue to provide a service for the terminal device, retaining, by the source user plane network element, a context of a first session, and sending a first notification message to a control plane network element, where the first notification message is used to trigger the control plane network element to send instruction information to the terminal device, and the instruction information is used to instruct the terminal device to trigger establishment of a second session after data to be sent to the terminal device is obtained, where the first session is an established session between the source user plane network element and the terminal device, and the second session is a session between a target user plane network element and the terminal device.

The source user plane network element retains the context of the first session before the second session is established. Therefore, even if there is downlink data to be sent to the terminal device, the downlink data can also be accurately sent to the terminal device, thereby ensuring that no packet loss occurs in the downlink data. In addition, the second session is established through triggering after the terminal device obtains the data to be sent to the terminal device. Therefore, a case in which the second session is established while no data is transmitted does not occur. In this way, waste of core network resources is reduced, and unnecessary signaling transmission is also reduced.

Optionally, in a possible implementation of this application, the method further includes: further receiving, by the source user plane network element, a second notification message from the control plane network element after the source user plane network element sends the first notification message to the control plane network element. In this way, the source user plane network element releases the context of the first session after receiving the second notification message.

After the source user plane network element sends the first notification message to the control plane network element, the control plane network element sends the instruction information to the terminal device, to instruct the terminal device to trigger establishment of the second session after the data to be sent to the terminal device is obtained. After the second session is established, the control plane network element sends the second notification message to the source user plane network element, so that the source user plane network element releases the context of the first session based on the second notification message, thereby reducing resource waste of the source user plane network element.

Optionally, in another possible implementation of this application, a method for determining, by the source user plane network element, whether to continue to provide a service for the terminal device is as follows: The source user plane network element determines, based on a first condition, whether to continue to provide a service for the terminal device, where the first condition includes that a data volume of uplink data received by the source user plane network element within a preset time period is greater than or equal to a preset threshold.

According to a second aspect, a user plane network element is provided, where the user plane network element is the foregoing source user plane network element. The user plane network element includes a processing unit and a sending unit.

Functions implemented by the unit modules provided in this application are specifically as follows:

The processing unit is configured to: determine whether to continue to provide a service for a terminal device, and retain a context of a first session if determining not to continue to provide a service for the terminal device, where the first session is an established session between the source user plane network element and the terminal device. The sending unit is configured to send a first notification message to a control plane network element, where the first notification message is used to trigger the control plane network element to send instruction information to the terminal device, the instruction information is used to instruct the terminal device to trigger establishment of a second session after data to be sent to the terminal device is obtained, and the second session is a session between a target user plane network element and the terminal device.

Further, in a possible implementation of this application, the user plane network element in this embodiment of this application further includes a receiving unit. The receiving unit is configured to receive a second notification message from the control plane network element after the sending unit sends the first notification message to the control plane network element. The processing unit is further configured to release the context of the first session after the receiving unit receives the second notification message.

Further, in another possible implementation of this application, the processing unit is specifically configured to determine, based on a first condition, whether to continue to provide a service for the terminal device, where the first condition includes that a data volume of uplink data received by the source user plane network element within a preset time period is greater than or equal to a preset threshold.

According to a third aspect, a user plane network element is provided, where the user plane network element is the foregoing source user plane network element. The user plane network element includes a processor, a memory, and a communications interface. The memory is configured to store computer program code, the computer program code includes an instruction, and the processor, the communications interface, and the memory are connected by using a bus. When the user plane network element runs, the processor executes the instruction stored in the memory, so that the user plane network element performs the session migration method according to any one of the first aspect and the possible implementations of the first aspect.

According to a fourth aspect, a computer storage medium is provided, where the computer storage medium stores computer program code. When the processor of the user plane network element in the third aspect executes the computer program code, a session management function entity performs the session migration method according to any one of the first aspect and the possible implementations of the first aspect.

According to a fifth aspect, a computer program product including an instruction is further provided. When the computer program product runs on a user plane network element, the user plane network element performs the session migration method according to any one of the first aspect and the possible implementations of the first aspect.

In this application, a name of the user plane network element constitutes no limitation on devices or function modules. In actual implementation, the devices or the function modules may have other names. The devices or the function modules fall within the scopes of the claims of this application and equivalent technologies thereof provided that functions of the devices or the function modules are similar to those in this application.

For detailed description of the second aspect, the third aspect, the fourth aspect, the fifth aspect, and the implementations thereof in this application, refer to detailed description of the first aspect and the implementations of the first aspect. In addition, for beneficial effects of the second aspect, the third aspect, the fourth aspect, the fifth aspect, and the implementations thereof, refer to analysis of beneficial effects of the first aspect and the implementations of the first aspect. Details are not described herein again.

According to a sixth aspect, a session migration method is provided, including: establishing, by a terminal device, a first session with a source user plane network element; obtaining, by the terminal device, instruction information; and sending a session establishment request to a control plane network element based on the instruction information, to trigger establishment of a second session, where the second session is a session between a target user plane network element and the terminal device.

Optionally, in a possible implementation of this application, a method for sending, by the terminal device, the session establishment request to the control plane network element based on the instruction information is as follows: The terminal device sends the session establishment request to the control plane network element based on the instruction information after obtaining data to be sent to the terminal device.

The second session is established through triggering after the terminal device obtains the data to be sent to the terminal device. Therefore, a case in which the second session is established while no data is transmitted does not occur. In this way, waste of core network resources is reduced, and unnecessary signaling transmission is also reduced.

Optionally, in another possible implementation of this application, the method further includes: further sending, by the terminal device, an uplink registration packet to the target user plane network element, where the uplink registration packet is used to instruct the target user plane network element to instruct an application server to update a downlink transmission path, and the downlink transmission path is a path used to transmit downlink data to be sent to the terminal device.

According to a seventh aspect, a terminal device is provided, where the terminal device includes a processing unit, an obtaining unit, and a sending unit.

Functions implemented by the unit modules provided in this application are specifically as follows:

The processing unit is configured to establish a first session with a source user plane network element. The obtaining unit is configured to obtain instruction information. The sending unit is configured to send a session establishment request to a control plane network element based on the instruction information obtained by the obtaining unit, to trigger establishment of a second session, where the second session is a session between a target user plane network element and the terminal device.

Further, in a possible implementation of this application, the sending unit is specifically configured to send the session establishment request to the control plane network element based on the instruction information after obtaining data to be sent to the terminal device.

Further, in a possible implementation of this application, the sending unit is further configured to send an uplink registration packet to the target user plane network element, where the uplink registration packet is used to instruct the target user plane network element to instruct an application server to update a downlink transmission path, and the downlink transmission path is a path used to transmit downlink data to be sent to the terminal device.

According to an eighth aspect, a terminal device is provided, where the terminal device includes a processor, a memory, and a communications interface. The memory is configured to store computer program code, the computer program code includes an instruction, and the processor, the communications interface, and the memory are connected by using a bus. When the terminal device runs, the processor executes the instruction stored in the memory, so that the terminal device performs the session migration method according to any one of the sixth aspect and the possible implementations of the sixth aspect.

According to a ninth aspect, a computer storage medium is provided, where the computer storage medium stores computer program code. When the processor of the terminal device in the eighth aspect executes the computer program code, the terminal device performs the session migration method according to any one of the sixth aspect and the possible implementations of the sixth aspect.

According to a tenth aspect, a computer program product including an instruction is further provided. When the computer program product runs on a terminal device, the terminal device performs the session migration method according to any one of the sixth aspect and the possible implementations of the sixth aspect.

In this application, a name of the terminal device constitutes no limitation on devices or function modules. In actual implementation, the devices or the function modules may have other names. The devices or the function modules fall within the scopes of the claims of this application and equivalent technologies thereof provided that functions of the devices or the function modules are similar to those in this application.

For detailed description of the seventh aspect, the eighth aspect, the ninth aspect, the tenth aspect, and the implementations thereof in this application, refer to detailed description of the sixth aspect and the implementations of the sixth aspect. In addition, for beneficial effects of the seventh aspect, the eighth aspect, the ninth aspect, the tenth aspect, and the implementations thereof, refer to analysis of beneficial effects of the sixth aspect and the implementations of the sixth aspect. Details are not described herein again.

According to an eleventh aspect, a session migration method is provided, including: determining, by a control plane network element, instruction information after receiving a first notification message from a source user plane network element, and sending the instruction information to a terminal device, where the instruction information is used to instruct the terminal device to trigger establishment of a second session after data to be sent to the terminal device is obtained, and the second session is a session between the terminal device and a target user plane network element.

The instruction information sent by the control plane network element to the terminal device is used to instruct the terminal device to trigger establishment of the second session after the data to be sent to the terminal device is obtained. Therefore, the second session in this application is established through triggering after the terminal device obtains the data to be sent to the terminal device. Therefore, a case in which the second session is established while no data is transmitted does not occur. In this way, waste of core network resources is reduced, and unnecessary signaling transmission is also reduced.

Optionally, in another possible implementation of this application, the method further includes: further sending, by the control plane network element, a second notification message to the source user plane network element after the second session is established, where the second notification message is used to instruct the source user plane network element to release a context of a first session, and the first session is a session established by the terminal device with the source user plane network element before the second session is established.

The control plane network element sends the second notification message to the source user plane network element, so that the source user plane network element releases the context of the first session based on the second notification message, thereby reducing resource waste of the source user plane network element.

According to a twelfth aspect, a control plane network element is provided, where the control plane network element includes a receiving unit, a processing unit, and a sending unit.

Functions implemented by the unit modules provided in this application are specifically as follows:

The receiving unit is configured to receive a first notification message from a source user plane network element. The processing unit is configured to determine instruction information after the receiving unit receives the first notification message, where the instruction information is used to instruct a terminal device to trigger establishment of a second session after data to be sent to the terminal device is obtained, and the second session is a session between the terminal device and a target user plane network element. The sending unit is configured to send the instruction information determined by the processing unit to the terminal device.

Further, in a possible implementation of this application, the sending unit is further configured to send a second notification message to the source user plane network element after the second session is established, where the second notification message is used to instruct the source user plane network element to release a context of a first session, and the first session is a session established by the terminal device with the source user plane network element before the second session is established.

According to a thirteenth aspect, a control plane network element is provided, where the control plane network element includes a processor, a memory, and a communications interface. The memory is configured to store computer program code, the computer program code includes an instruction, and the processor, the communications interface, and the memory are connected by using a bus. When the control plane network element runs, the processor executes the instruction stored in the memory, so that the control plane network element performs the session migration method according to any one of the eleventh aspect and the possible implementations of the eleventh aspect.

According to a fourteenth aspect, a computer storage medium is provided, where the computer storage medium stores computer program code. When the processor of the control plane network element in the thirteenth aspect executes the computer program code, the control plane network element performs the session migration method according to any one of the eleventh aspect and the possible implementations of the eleventh aspect.

According to a fifteenth aspect, a computer program product including an instruction is further provided. When the computer program product runs on a control plane network element, the control plane network element performs the session migration method according to any one of the eleventh aspect and the possible implementations of the eleventh aspect.

In this application, a name of the control plane network element constitutes no limitation on devices or function modules. In actual implementation, the devices or the function modules may have other names. The devices or the function modules fall within the scopes of the claims of this application and equivalent technologies thereof provided that functions of the devices or the function modules are similar to those in this application.

For detailed description of the twelfth aspect, the thirteenth aspect, the fourteenth aspect, the fifteenth aspect, and the implementations thereof in this application, refer to detailed description of the eleventh aspect and the implementations of the eleventh aspect. In addition, for beneficial effects of the twelfth aspect, the thirteenth aspect, the fourteenth aspect, the fifteenth aspect, and the implementations thereof, refer to analysis of beneficial effects of the eleventh aspect and the implementations of the eleventh aspect. Details are not described herein again.

These or other aspects of the embodiments of this application are more concise and understandable from the following description.

DETAILED DESCRIPTION OF ILLUSTRATIVE EMBODIMENTS

In the specification, claims, and accompanying drawings of this application, the terms "first", "second", "third", and the like are intended to distinguish between different objects but not to limit a particular order.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a related concept in a specific manner.

With development of communications technologies, a next generation wireless communications system such as an NB-IoT system emerges. The NB-IoT system is mainly applied to internet of things scenarios such as smart environment monitoring, smart city, smart metering, object tracking, smart farm, smart industry, and smart home. To meet massive fragmented NB-IoT internet of things applications with low costs, a low rate, and low power consumption, a core network device in the NB-IoT system completes service transmission by using a small data packet (small packet for short).

A service for transmitting small data is usually referred to as a small packet service. Features of the small packet service are that packet transmission frequency of a terminal device is low, small data is transmitted, there are relatively low requirements on both a delay and QoS, and a continuous session does not need to be always maintained between the core network device and the terminal device.

Figure 1:
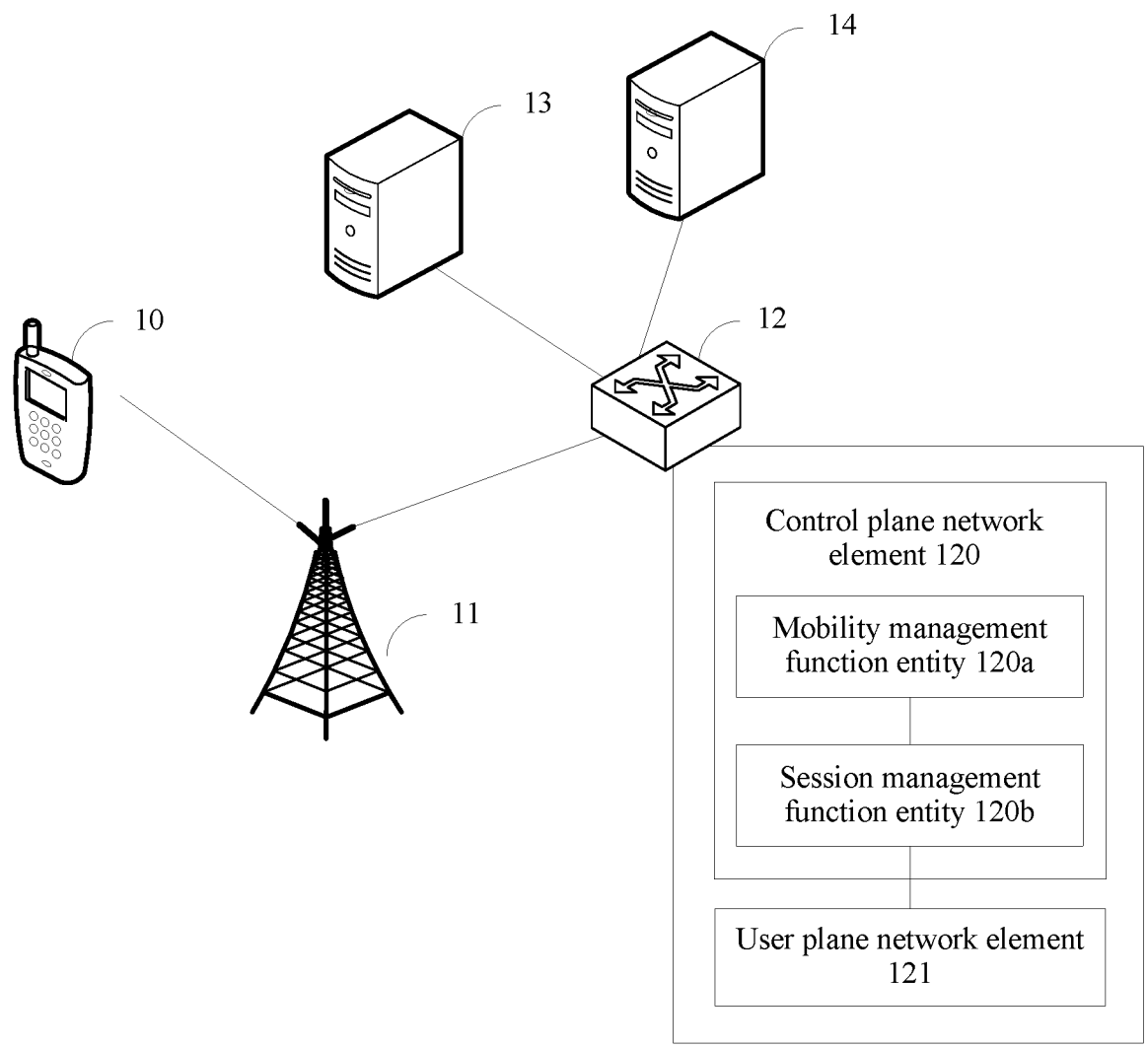
FIG. 1 is a schematic structural diagram of an existing next generation wireless communications system.

Similar to a common communications system, a terminal device in the next generation wireless communications system is connected to an application server located in an external data network by using a radio access network device and a core network device. As shown in FIG. 1, an existing next generation wireless communications system includes a terminal device to, a radio access network device 11, a core network device 12, and an application server 13. The terminal device 10 is connected to the radio access network device 11, the radio access network device 11 is further connected to the core network device 12, and the core network device 12 is connected to the application server 13. In actual application, connections between the plurality of devices are wireless connections. For ease of visually indicating connection relationships between the devices, solid lines are used for illustration in FIG. 1.

A control plane function and a user plane function of the core network device 12 may be independently disposed, or may be integrated into a same device.

In the embodiments of this application, a control plane network element 120 is used to represent a device that can implement the control plane function of the core network device 12, and a user plane network element 121 is used to represent a device that can implement the user plane function of the core network device 12. Correspondingly, the control plane network element 120 and the user plane network element 121 may be independently disposed, or may be integrated into a same device. In a scenario in which the control plane network element 120 and the user plane network element 121 are independently disposed, the application server 13 is connected to the user plane network element 121.

The control plane network element 120 has a mobility management function of a terminal device, a session management function, an Internet Protocol (IP) address allocation function, a function of generating a forwarding rule of a gateway user plane, and the like. The control plane network element 120 may be a mobility management entity (MME), may be a policy and charging rules function (PCRF) entity, or may be a device into which a function of an MME, a function of a PCRF, and a function of another gateway are integrated.

The control plane network element 120 may include a mobility management (MM) function entity 120a and a session management (SM) function entity 120b. The mobility management function entity 120a and the session management function entity 120b may be independently disposed, or may be integrated into a same device.

The mobility management function entity 120a is responsible for attachment of the terminal device, mobility management, tracking area (TA) update, temporary identity (ID) allocation to the terminal device, authentication and authorization for the terminal device, and the like. The session management function entity 120b is responsible for selection of the user plane network element 121 for the terminal device, migration of the user plane network element 121, IP address allocation, and the like.

In addition, the next generation wireless communications system shown in FIG. 1 further includes a user data management (UDM) device 14. The UDM device 14 is connected to both the mobility management function entity 120a and the session management function entity 120b. The mobility management function entity 120a may obtain mobility management subscription data of the terminal device 10 from the UDM device 14, and the session management function entity 120b may obtain session management subscription data of the terminal device 10 from the UDM device 14.

In the next generation wireless communications system shown in FIG. 1, when a data transmission service between the terminal device 10 and the core network device 12 is a small packet service, an interface between the radio access network device 11 and the core network device 12 is in a connectionless state, the radio access network device does not store a context of the terminal device to, and the core network device 12 stores the context of the terminal device 10. Herein, the context of the terminal device 10 includes a mobility management context of the terminal device 10 and a session management context of the terminal device 10. In an application scenario in which the control plane network element 120 and the user plane network element 121 in the core network device 12 are independently disposed, uplink data from the terminal device 10 may be transmitted along the terminal device 10→the radio access network device 11→the user plane network element 121→the application server 13. For downlink data to be sent to the terminal device to, the downlink data may be transmitted along the application server 13→the user plane network element 121→the radio access network device 11→the terminal device 10. In other words, data from the terminal device 10 may be transmitted based on the user plane network element 121 in the core network device 12.

In the prior art, in a scenario in which a first session is established between a terminal device and both a control plane network element and a source user plane network element, when the terminal device moves, and a quantity of hops of a transmission path used to transmit data from the terminal device is greater than or equal to a preset threshold, or when a load of the source user plane network element is greater than or equal to a preset threshold, the source user plane network element no longer continues to provide a service for the terminal device, and the source user plane network element sends a notification message to the control plane network element, to instruct the control plane network element to release the first session. The control plane network element may immediately release the first session, and instruct the terminal device to re-send a session establishment request to the control plane network element. In this way, the control plane network element may select a new user plane network element for the terminal device, where the newly selected user plane network element is referred to as a target user plane network element, to establish a second session between the terminal device and both the control plane network element and the target user plane network element, so that the terminal device can transmit data from the terminal device by using the target user plane network element.

In the method, the terminal device establishes the second session between the terminal device and the target user plane network element after receiving an instruction sent by the control plane network element. However, the control plane network element releases the first session when sending the instruction to the terminal device. Therefore, for downlink data to be sent to the terminal device, there may be no data transmission link to transmit the downlink data. Consequently, a packet loss may occur in the downlink data. In addition, the second session is established after the first session is released, and if the terminal device does not transmit data based on the second session, a core network resource is wasted, and unnecessary signaling transmission is performed.

For the foregoing problem, the embodiments of this application provide a session migration method. In the session migration method, if a first session is established between a source user plane network element and a terminal device, when the source user plane network element determines not to continue to provide a service for the terminal device, the source user plane network element retains a context of the first session, and sends a first notification message to a control plane network element, to trigger the control plane network element to send instruction information to the terminal device, where the instruction information is used to instruct the terminal device to trigger establishment of a second session after data to be sent to the terminal device is obtained, and the second session is a session between the terminal device and a target user plane network element. The source user plane network element retains the context of the first session before the second session is established. Therefore, even if there is downlink data to be sent to the terminal device, the downlink data can also be accurately sent to the terminal device, thereby ensuring that no packet loss occurs in the downlink data. In addition, the second session is established through triggering after the terminal device obtains the data to be sent to the terminal device. Therefore, in a scenario in which no data from the terminal device needs to be transmitted, the second session does not need to be established. In this way, waste of core network resources is reduced, and unnecessary signaling transmission is also reduced.

The session migration method provided in the embodiments of this application is applicable to a wireless communications system in which there is a small packet service. The wireless communications system may be the foregoing next generation wireless communications system. For ease of description, in the embodiments of this application, an example in which the wireless communications system is the next generation wireless communications system shown in FIG. 1 is used for description.

The terminal device to in the embodiments of this application may be a device that provides a user with voice and/or data connectivity, a handheld device with a wireless connection function, or another processing device connected to a wireless modem. A wireless terminal may communicate with one or more core networks by using a radio access network (RAN). The wireless terminal may be a mobile terminal such as a mobile phone (also referred to as a "cellular" phone) or a computer with a mobile terminal, or may be a portable, pocket-sized, handheld, computer built-in, or vehicle-mounted mobile apparatus that exchanges voice and/or data with the radio access network, for example, a mobile phone, a tablet computer, a notebook computer, a netbook, or a personal digital assistant (PDA).

The radio access device 11 in the embodiments of this application may be a radio access point (AP), may be an evolved NodeB (eNB), or may be an NR gNB, where the NR gNB represents a base station in a 5th generation communications technology (5G) network. This is not specifically limited in the embodiments of this application.

It may be learned from the foregoing description that the control plane network element and the user plane network element may be independently disposed, or may be integrated into a same device. In the embodiments of this application, an example in which the control plane network element and the user plane network element are independently disposed is mainly used for description.

For ease of description, in the embodiments of this application, the radio access network device is represented by using a base station, the source user plane network element is represented by using a user plane network element 1, and the target user plane network element is represented by using a user plane network element 2.

Figure 2:
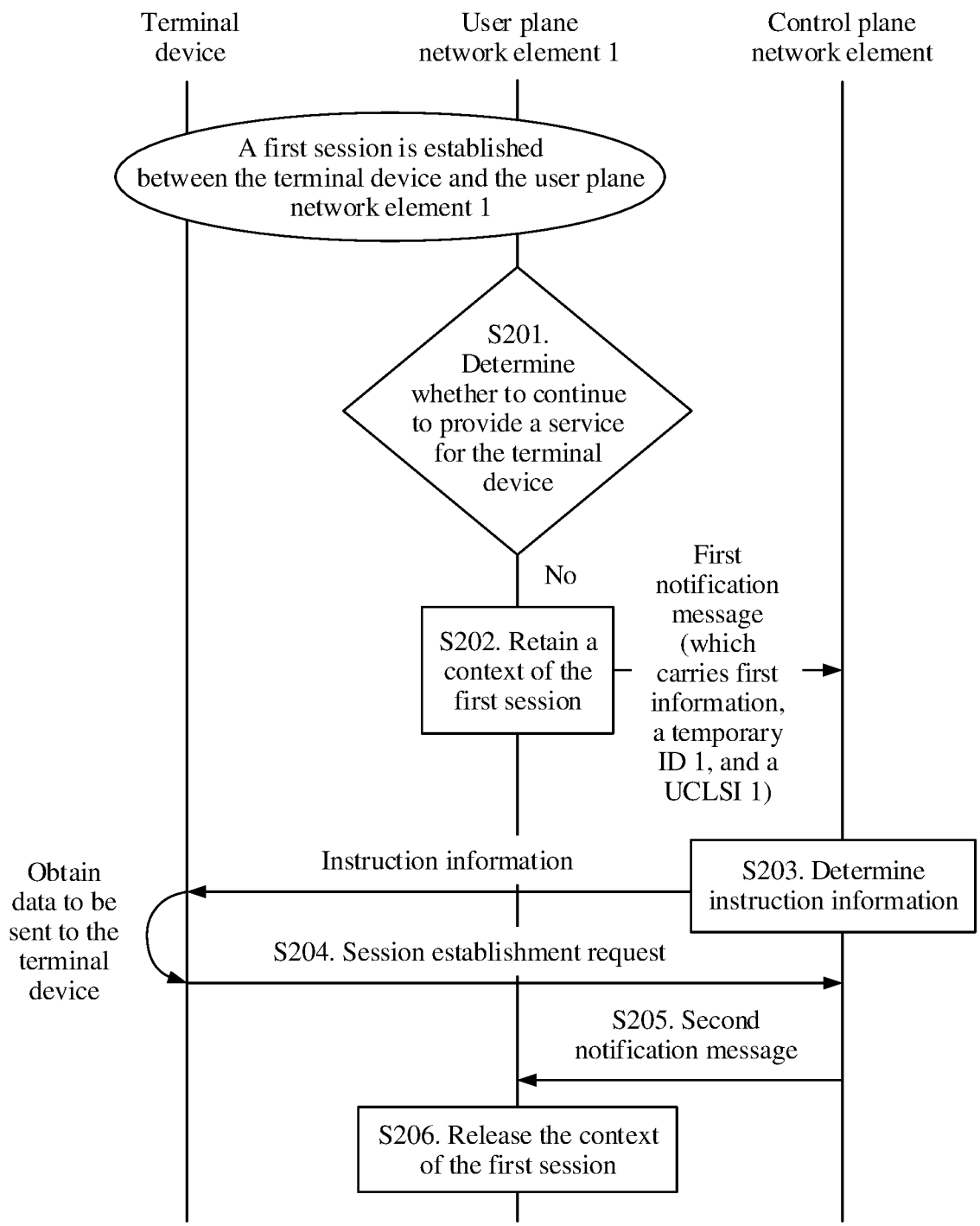
FIG. 2 is a first schematic flowchart of a session migration method according to an embodiment of this application.
Figure 3A:
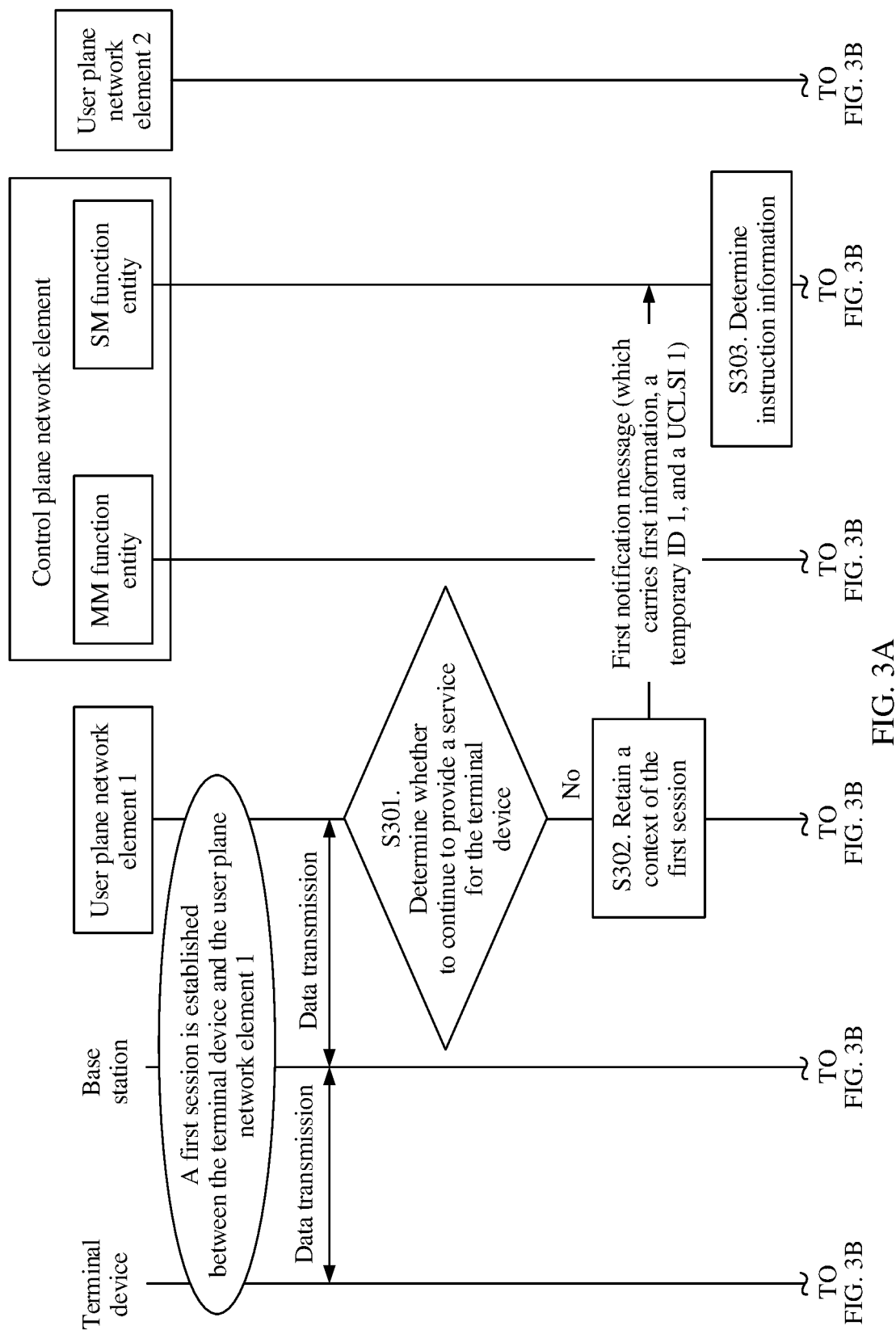
FIG. 3A, FIG. 3B, FIG. 3C, and FIG. 3D are a second schematic flowchart of a session migration method according to an embodiment of this application.
Figure 3B:
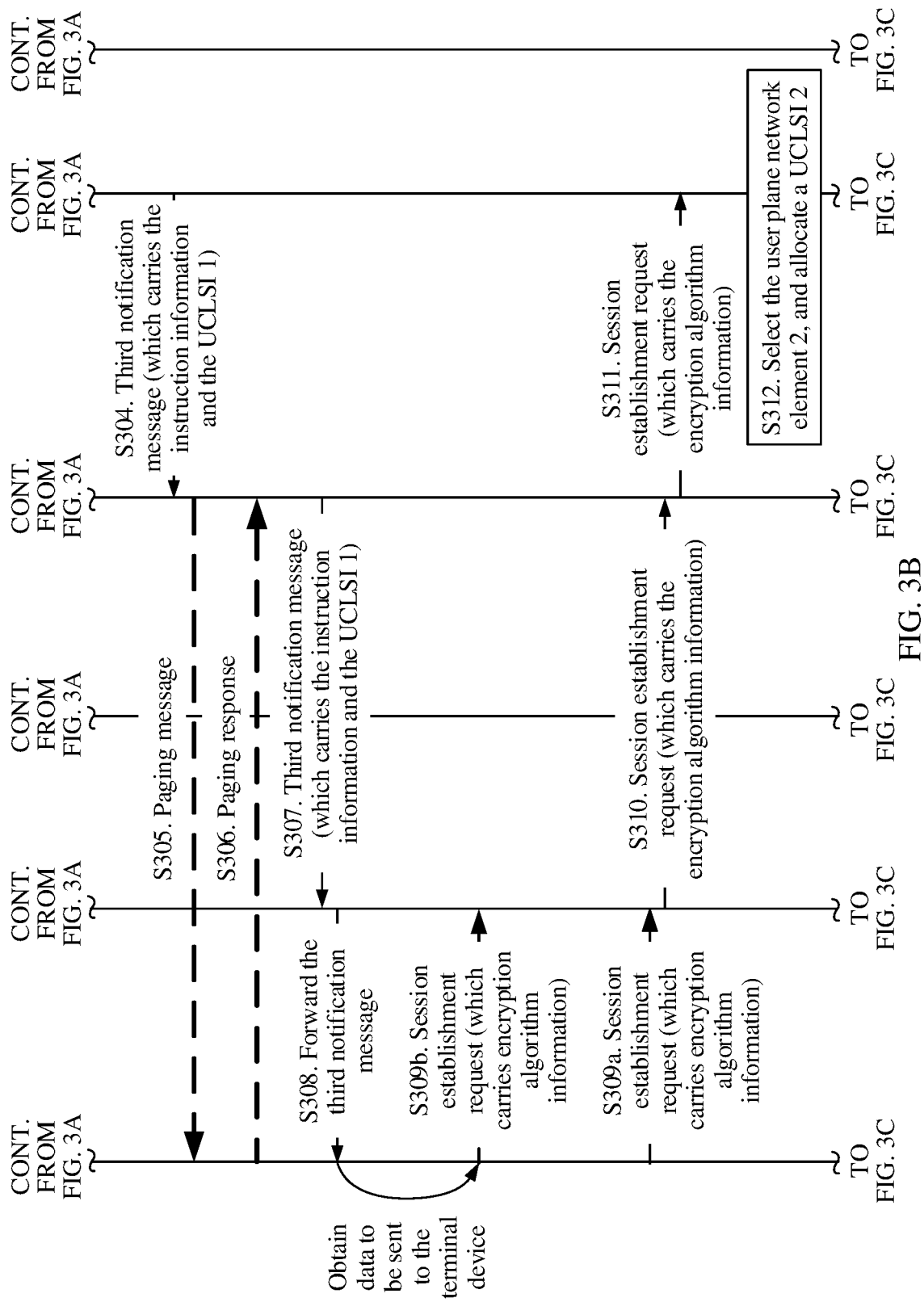
Figure 3C:
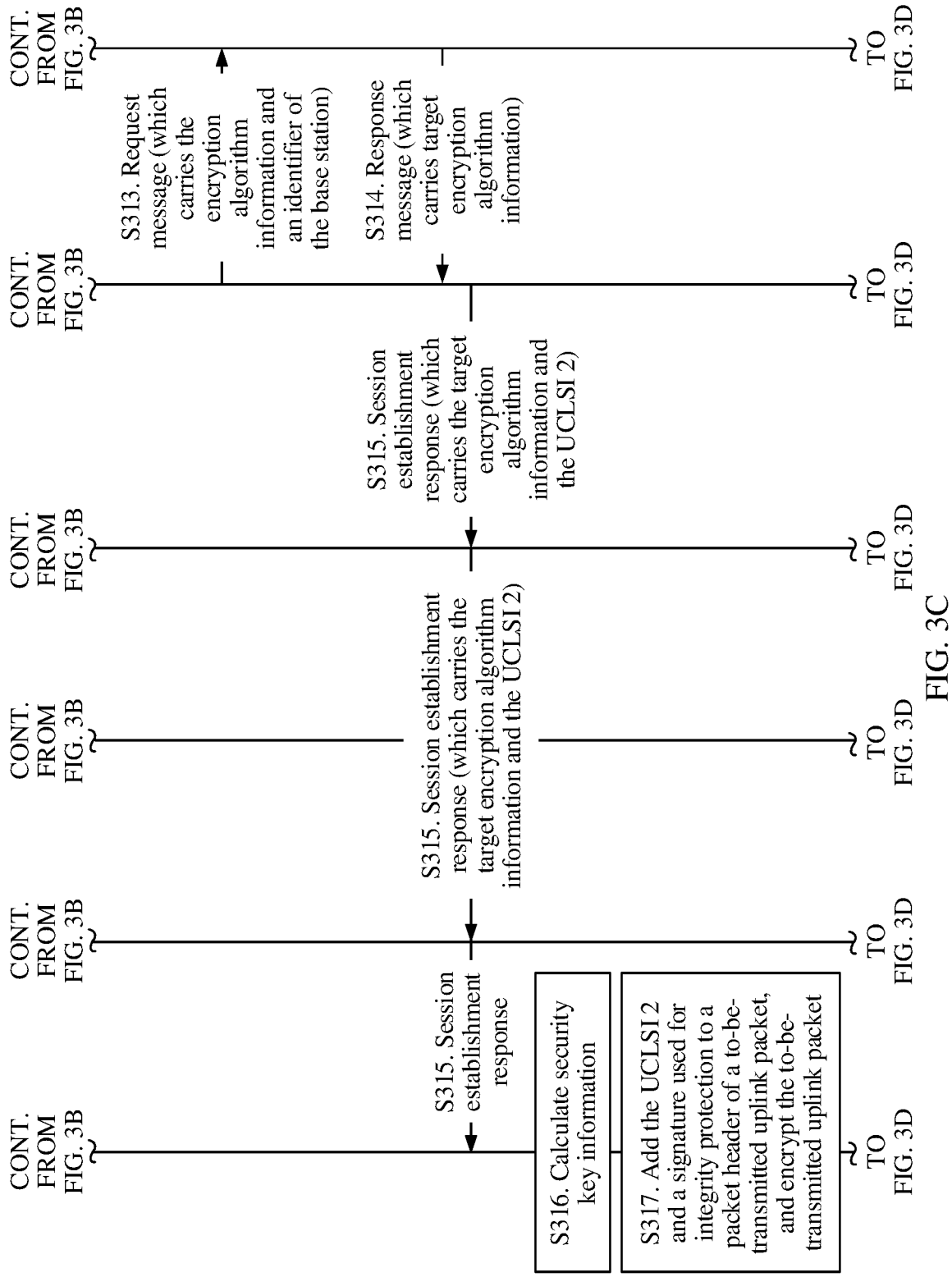
Figure 3D:
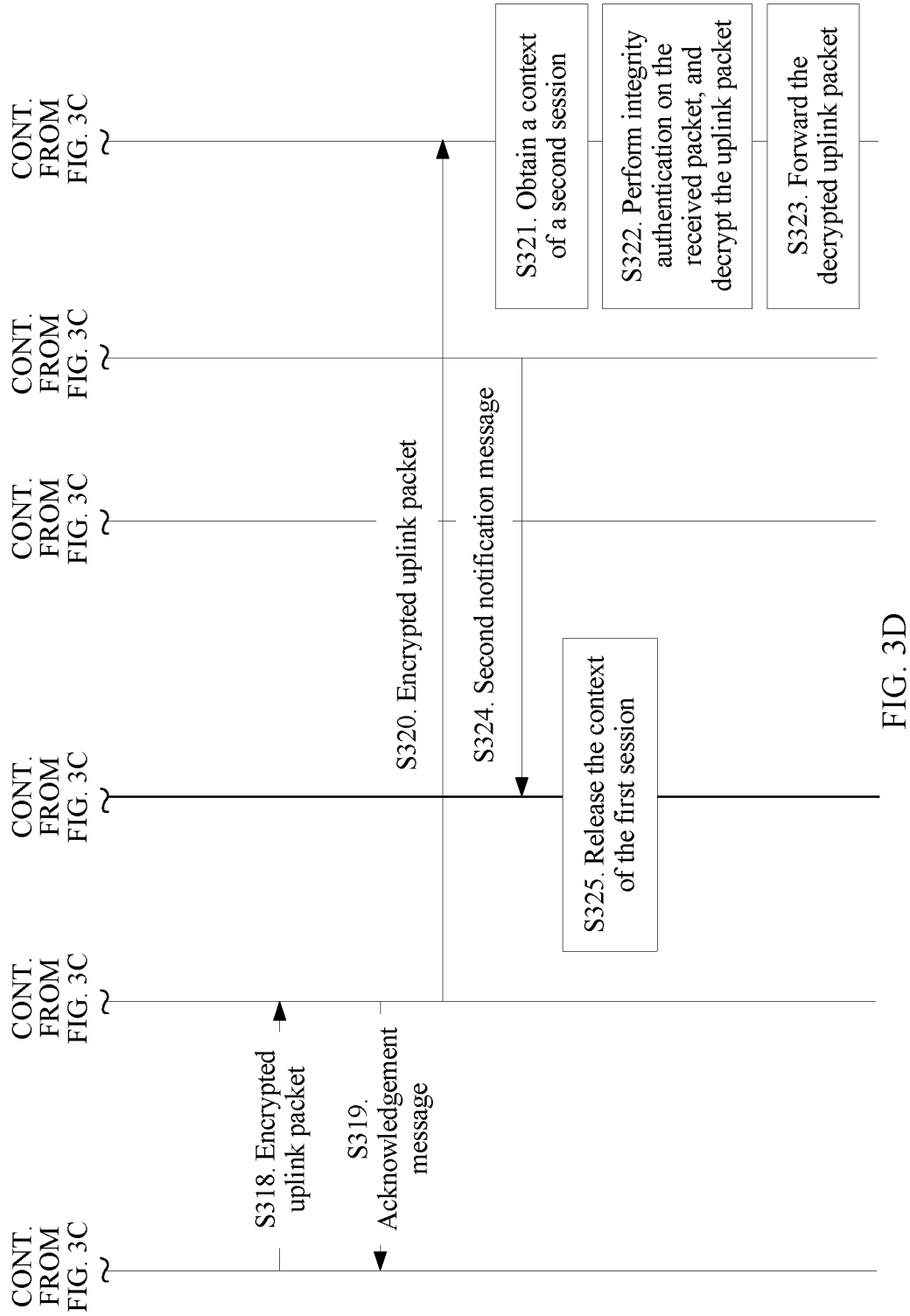
Figure 4A:
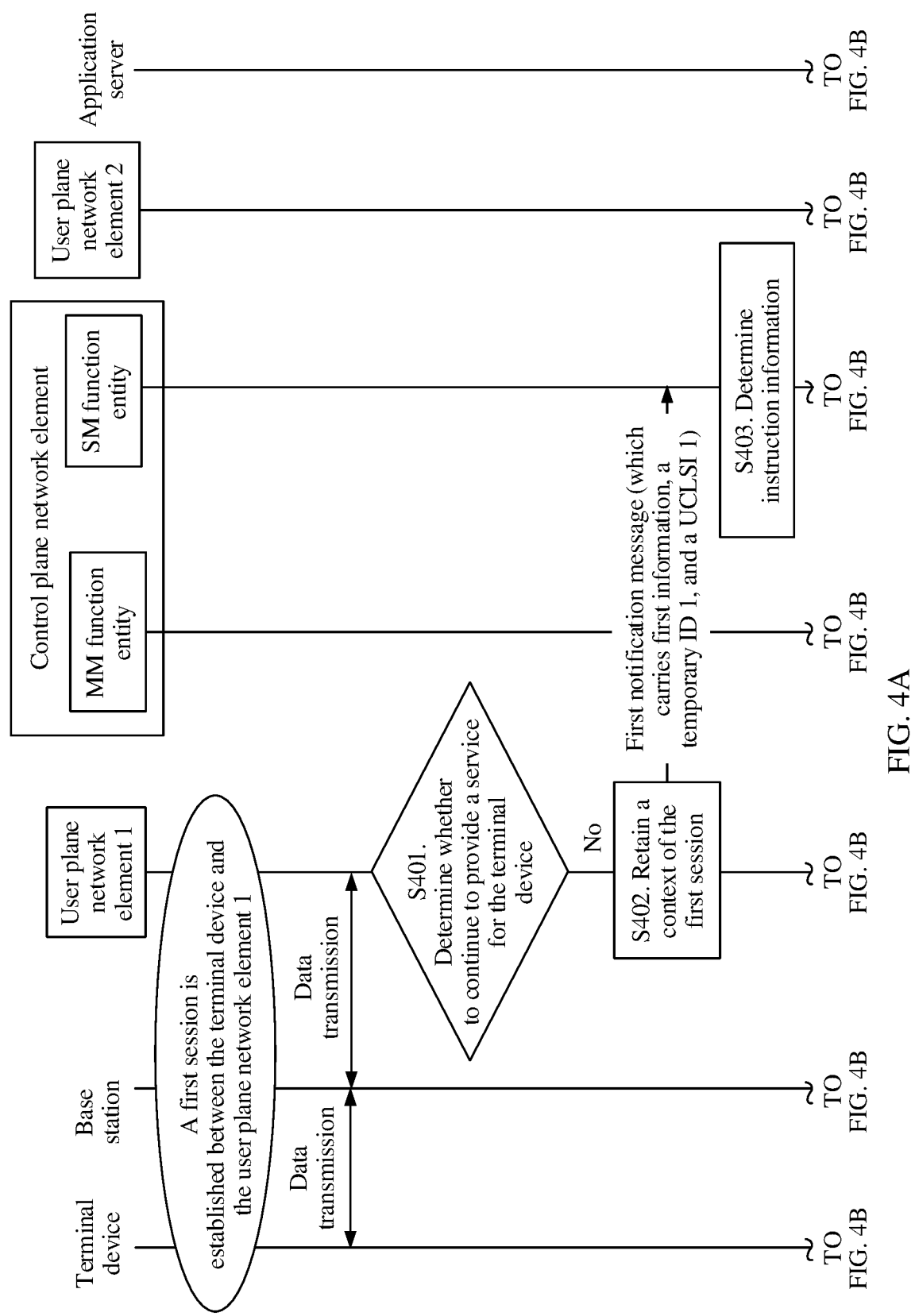
FIG. 4A, FIG. 4B, FIG. 4C, and FIG. 4D are a third schematic flowchart of a session migration method according to an embodiment of this application.
Figure 4B:
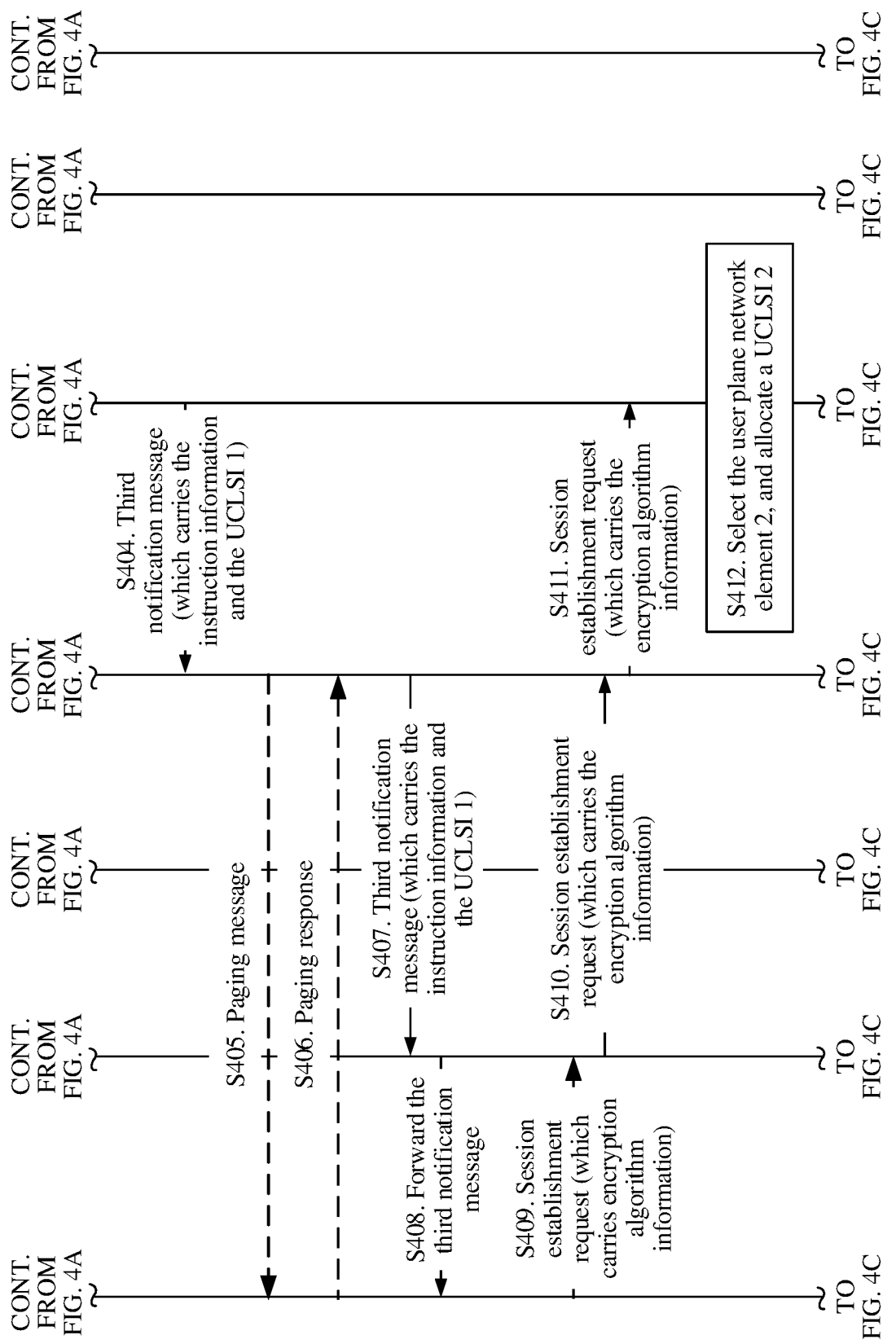
Figure 4C:
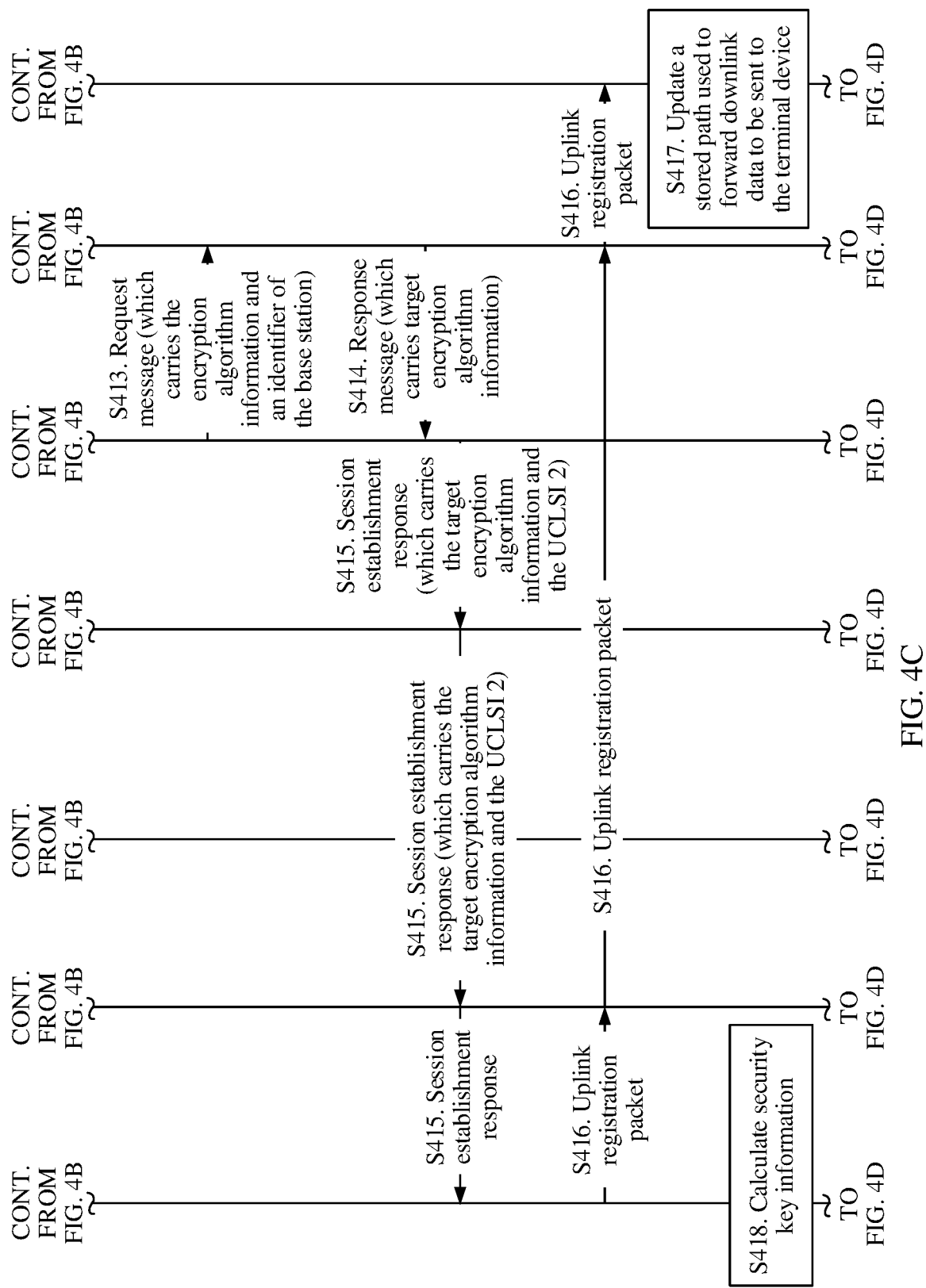
Figure 4D:
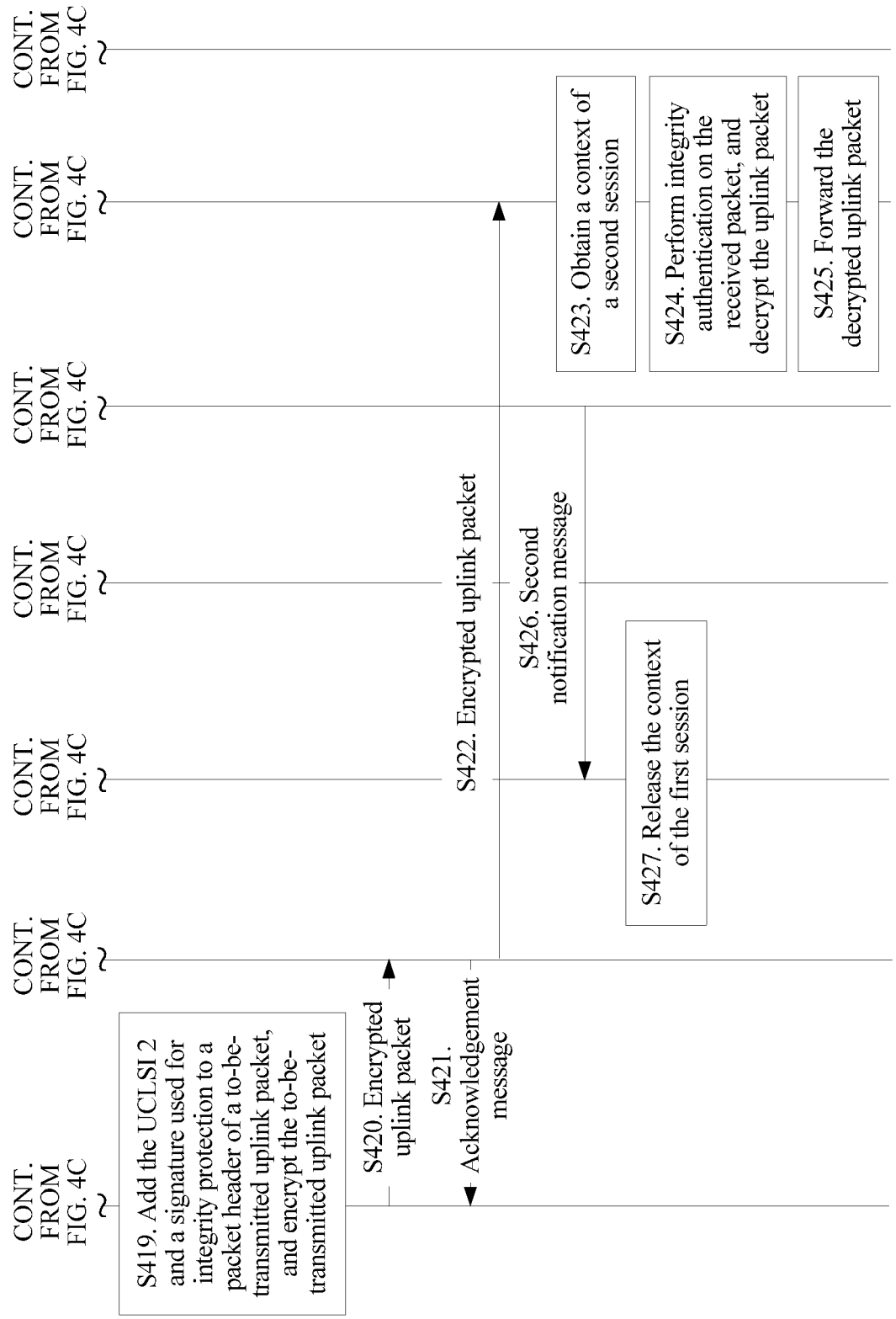

FIG. 2 is a schematic flowchart of a session migration method according to an embodiment of this application. The session migration method may be applied to the next generation wireless communications system shown in FIG. 1.

Referring to FIG. 2, the session migration method includes the following steps.

S201. In a scenario in which a first session is established between a terminal device and a user plane network element 1, the user plane network element 1 determines whether to continue to provide a service for the terminal device.

That a first session is established between a terminal device and a user plane network element 1 is equivalent to that the first session is established between the terminal device and both a control plane network element and the user plane network element 1. Both the control plane network element and the user plane network element 1 store a context of the first session.

When the first session is established between the terminal device and the user plane network element 1, it indicates that the control plane network element obtains subscription data of the terminal device from a UDM device, performs authentication and authorization for the terminal device based on the subscription data, allocates a temporary ID (the temporary ID is represented by using a temporary ID1 in this embodiment of this application) to the terminal device, selects the user plane network element 1 for the terminal device, allocates a user plane gateway connectionless identifier (UCLSI) (the UCLSI is represented by using a UCSI1 in this embodiment of this application) used to identify the first session to the terminal device, and allocates an IP address to the terminal device.

With reference to the foregoing description, it may be learned that after the first session is established between the terminal device and the user plane network element 1, uplink data from the terminal device may be transmitted along the terminal device→a base station→the user plane network element 1→an application server. For downlink data to be sent to the terminal device, the downlink data may be transmitted along the application server→the user plane network element 1→a radio access network device→the terminal device.

In a data transmission process, the user plane network element 1 determines, based on a first condition, whether to continue to provide a service for the terminal device.

Optionally, the first condition includes that a data volume of uplink data received by the user plane network element 1 within a preset time period is greater than or equal to a preset threshold. Herein, the uplink data received by the user plane network element 1 within the preset time period may include uplink data sent by the terminal device, and may further include uplink data sent by another terminal device that establishes a session with the user plane network element 1.

If the user plane network element 1 determines not to continue to provide a service for the terminal device, the user plane network element 1 retains the context of the first session, and sends a first notification message to a control plane network element.

The first notification message carries first information, the temporary ID1ID1, and the UCSI1. The first information is used to indicate that the user plane network element 1 no longer continues to provide a service for the terminal device.

Optionally, the first notification message further carries frequency information. The frequency information is used to indicate data sending frequency of the terminal device.

S203. After receiving the first notification message, the control plane network element determines instruction information, and sends the instruction information to the terminal device.

If the first notification message does not carry the frequency information, the control plane network element determines the instruction information based on the subscription data of the terminal device after receiving the first notification message.

If the first notification message further carries the frequency information, the control plane network element determines the instruction information based on the subscription data and the frequency information of the terminal device after receiving the first notification message.

The instruction information is used to instruct the terminal device to send a session establishment request to the control plane network element after data to be sent to the terminal device is obtained, to trigger establishment of a second session.

S204. The terminal device sends the session establishment request to the control plane network element based on the instruction information after obtaining the data to be sent to the terminal device, to establish the second session.

S205. The control plane network element sends a second notification message to the user plane network element 1 after the second session is established.

S206. The user plane network element 1 releases the context of the first session after receiving the second notification message.

In this embodiment of this application, the user plane network element 1 retains the context of the first session before the second session is established. Therefore, even if there is downlink data to be sent to the terminal device, the downlink data can also be accurately sent to the terminal device, thereby ensuring that no packet loss occurs in the downlink data. In addition, the second session is established through triggering after the terminal device obtains the data to be sent to the terminal device. Therefore, a case in which the second session is established while no data is transmitted does not occur. In this way, waste of core network resources is reduced, and unnecessary signaling transmission is also reduced.

It may be learned from the foregoing description that in this embodiment of this application, the user plane network element 1 determines, based on the first condition, whether to continue to provide a service for the terminal device. Herein, the first condition includes that the data volume of the uplink data received by the user plane network element 1 within the preset time period is greater than or equal to the preset threshold, and this is equivalent to that the uplink data triggers the user plane network element not to continue to provide a service for the terminal device. Alternatively, the first condition may include that a data volume of downlink data that is received by the user plane network element 1 within a preset time period and that is to be sent to the terminal device is greater than or equal to a preset threshold, and this is equivalent to that the downlink data to be sent to the terminal device triggers the user plane network element not to continue to provide a service for the terminal device.

It may be learned that the session migration method provided in this embodiment of this application is applicable to the following two application scenarios.

In a first scenario, the uplink data triggers the user plane network element not to continue to provide a service for the terminal device.

In a second scenario, the downlink data to be sent to the terminal device triggers the user plane network element not to continue to provide a service for the terminal device.

To more clearly understand the session migration method provided in the embodiments of this application, each of the foregoing application scenarios is described in the embodiments of this application.

To facilitate understanding of the session migration method provided in the embodiments of this application, an example in which an MM function entity and an SM function entity are independently disposed is used for description in the embodiments of this application.

FIG. 3A, FIG. 3B, FIG. 3C, and FIG. 3D show a procedure of a session migration method according to an embodiment of this application in the foregoing first application scenario.

Referring to FIG. 3A, FIG. 3B, FIG. 3C, and FIG. 3D, the session migration method according to this embodiment of this application includes the following steps.

S301. In a scenario in which a first session is established between a terminal device and a user plane network element 1, the user plane network element 1 determines whether to continue to provide a service for the terminal device.

In a process of establishing the first session between the terminal device and the user plane network element 1, both an SM function entity and the user plane network element 1 store a context of the first session.

In the process of establishing the first session between the terminal device and the user plane network element 1, the terminal device sends a session establishment request to an MM function entity. The MM function entity obtains mobility management subscription data of the terminal device from a UDM device, performs authentication and authorization for the terminal device based on the mobility management subscription data of the terminal device, allocates a temporary ID1 to the terminal device, and selects the SM function entity for the terminal device. The SM function entity selected by the MM function entity obtains session management subscription data of the terminal device from the UDM device, selects the user plane network element 1 for the terminal device, allocates a UCLSI1 to the terminal device, and allocates an IP address to the terminal device.

As shown in FIG. 3A, FIG. 3B, FIG. 3C, and FIG. 3D, after the first session is established between the terminal device and the user plane network element 1, uplink data from the terminal device is transmitted along the terminal device→a base station→the user plane network element 1. Correspondingly, downlink data to be sent to the terminal device is transmitted along the user plane network element 1→the base station→the terminal device.

In this embodiment of this application, the context of the first session includes the IP address of the terminal device, address information of the user plane network element 1, the UCLSI1, address information of a control plane network element, and the like in the first session.

In a data transmission process, the user plane network element 1 determines whether a data transmission path currently used to transmit data from the terminal device meets a preset condition (the preset condition may be whether a quantity of hops of a data transmission path is greater than or equal to a preset quantity of hops), so as to determine whether to continue to provide a service for the terminal device. Alternatively, the user plane network element 1 determines whether a data volume of uplink data received by the user plane network element 1 within a preset time period is greater than or equal to a preset threshold, so as to determine, based on a determining result, whether to continue to provide a service for the terminal device. The preset time period herein is any time period with preset duration.

Optionally, if the user plane network element 1 determines that a quantity of hops of the data transmission path currently used to transmit the data of the terminal device is greater than or equal to the preset quantity of hops, the user plane network element 1 determines not to continue to provide a service for the terminal device. Otherwise, the user plane network element 1 determines to continue to provide a service for the terminal device.

Optionally, if the user plane network element 1 determines that the data volume of the uplink data received by the user plane network element 1 within the preset time period is greater than or equal to the preset threshold, the user plane network element 1 determines not to continue to provide a service for the terminal device. Otherwise, the user plane network element 1 determines to continue to provide a service for the terminal device.

S302. If the user plane network element 1 determines not to continue to provide a service for the terminal device, the user plane network element 1 retains a context of the first session, and sends a first notification message to an SM function entity.

The first notification message carries first information, the temporary ID1ID1, and the UCLSI1. The first information is used to indicate that the user plane network element 1 no longer continues to provide a service for the terminal device.

Optionally, the first notification message further carries frequency information.

S303. The SM function entity determines instruction information after receiving the first notification message.

If the first notification message does not carry the frequency information, the SM function entity determines the instruction information based on the session management subscription data of the terminal device after receiving the first notification message.

If the first notification message further carries the frequency information, the SM function entity determines the instruction information based on the session management subscription data and the frequency information of the terminal device after receiving the first notification message.

In a scenario in which the first notification message further carries the frequency information, if data sending frequency of the terminal device is greater than or equal to preset frequency, the instruction information determined by the SM function entity is used to instruct the terminal device to immediately send a session establishment request to the MM function entity after the instruction information is obtained, to trigger establishment of a second session.

It is easily understood that when the SM function entity obtains the first notification message, the user plane network element 1 has determined not to continue to provide a service for the terminal device. When the data sending frequency of the terminal device is greater than or equal to the preset frequency, if the second session is not immediately established for the terminal device, a packet loss may occur in uplink data sent by the terminal device. Therefore, when the data sending frequency of the terminal device is greater than or equal to the preset frequency, the second session needs to be immediately established, so as to transmit the uplink data from the terminal device based on the second session.

On the contrary, in a scenario in which the first notification message further carries the frequency information, if data sending frequency of the terminal device is less than preset frequency, the instruction information determined by the SM function entity is used to instruct the terminal device to send a session establishment request to the MM function entity after data to be sent to the terminal device is obtained, to trigger establishment of a second session.

It is easily understood that when the SM function entity obtains the first notification message, the user plane network element 1 has determined not to continue to provide a service for the terminal device. When the data sending frequency of the terminal device is less than the preset frequency, the second session may be established after the terminal device obtains the data to be sent to terminal device. In this way, waste of core network resources can be reduced, and unnecessary signaling transmission can also be reduced. Therefore, when the data sending frequency of the terminal device is less than the preset frequency, the terminal device sends the session establishment request to the MM function entity after obtaining the data to be sent to terminal device, to trigger establishment of the second session.

S304. The SM function entity sends, to an MM function entity, a third notification message that carries the instruction information and a UCLSI1.

The MM function entity sends the third notification message to the terminal device after receiving the third notification message. Optionally, the session migration method provided in this embodiment of this application is applicable to a wireless communications system in which there is a small packet service, and data transmission frequency in the wireless communications system is relatively low. Therefore, the terminal device may be in an idle mode, or may be in a connected mode. If the terminal device is in the idle mode, S305 and S306 are performed after S304, and S307 is performed after S306. If the terminal device is in the connected mode, S307 is performed after S304. S305 and S306 are optional, and therefore are represented by using dashed lines in FIG. 3A, FIG. 3B, FIG. 3C, and FIG. 3D.

S305. The MM function entity sends a paging message to the terminal device.

S306. The terminal device sends a paging response to the MM function entity.

S307. The MM function entity forwards the third notification message in S304 to a base station.

S308. The base station forwards the third notification message in S307 to the terminal device.

The terminal device may learn, based on the instruction information in the third notification message, when to send the session establishment request to the control plane network element, and learn, based on the UCLSI1 in the third notification message, a specific session on which migration is performed.

Specifically, if the instruction information in this embodiment of this application is used to instruct the terminal device to immediately send the session establishment request to the MM function entity after the instruction information is obtained, S309*a* is performed after S308, and S310 is performed after S309*a*. If the instruction information in this embodiment of this application is used to instruct the terminal device to send the session establishment request to the MM function entity after the data to be sent to the terminal device is obtained, S309*b* is performed after S308, and S310 is performed after S309*b*.

S309*a*. The terminal device sends, to the base station based on the instruction information carried in the third notification message received by the terminal device in S308, a session establishment request that carries encryption algorithm information.

The encryption algorithm information is used to indicate an encryption algorithm supported by the terminal device. Optionally, the terminal device may support a plurality of encryption algorithms.

S309*b*. The terminal device sends, to the base station, a session establishment request that carries encryption algorithm information after obtaining data to be sent to the terminal device.

S310. The base station forwards the session establishment request received by the base station to the MM function entity.

It may be understood that if S309*a* is performed after S308, the base station forwards the session establishment request in S309*a* to the MM function entity in S310. It S309*b* is performed after S308, the base station forwards the session establishment request in S309*b* to the MM function entity in S310.

S311. The MM function entity forwards the session establishment request to the SM function entity.

S312. After receiving the session establishment request, the SM function entity selects a user plane network element 2 for the terminal device, and allocates a UCLSI2 to the terminal device.

The user plane network element 2 also supports a plurality of encryption algorithms, and there is an intersection set between the encryption algorithms supported by the user plane network element 2 and the encryption algorithms supported by the terminal device.

S313. The SM function entity sends a request message to the user plane network element 2, to request to allocate a user plane resource to a second session.

The request message carries the encryption algorithm information and an identifier of the base station.

S314. The user plane network element 2 sends, to the SM function entity, a response message that carries target encryption algorithm information.

The target encryption algorithm information is used to indicate an encryption algorithm used for the second session.

After receiving the request message, the user plane network element 2 selects one encryption algorithm from the intersection set between the plurality of encryption algorithms supported by the terminal device and the plurality of encryption algorithms supported by the user plane network element 2, and uses the selected encryption algorithm as a target encryption algorithm.

S315. The SM function entity sends, to the MM function entity, a session establishment response that carries the target encryption algorithm information and the UCLSI2, the MM function entity forwards the session establishment response to the base station, and the base station forwards the session establishment response to the terminal device.

A process of establishing the second session ends after the terminal device receives the session establishment response. In this way, uplink data from the terminal device is transmitted along the terminal device→the base station→the user plane network element 2. Correspondingly, downlink data to be sent to the terminal device is transmitted along the user plane network element 2→the base station→the terminal device.

The uplink data from the terminal device is embodied in a form of an uplink packet. Specifically, after S315, a transmission process of the uplink data from the terminal device is as follows:

S316. The terminal device calculates security key information based on the target encryption algorithm information in the session establishment response.

S317. The terminal device adds the UCLSI2 and a signature used for integrity protection to a packet header of a to-be-transmitted uplink packet, and encrypts the to-be-transmitted uplink packet.

S318. The terminal device sends the encrypted uplink packet to the base station.

S319. The base station sends an acknowledgement message to the terminal device.

S320. The base station sends the encrypted uplink packet to the user plane network element 2.

Optionally, after the base station receives the encrypted uplink packet, if the base station can identify the UCLSI2, the base station selects the corresponding user plane network element 2 based on user plane network element information identified by the UCSI2, and sends the encrypted uplink packet to the user plane network element 2.

Optionally, after the base station receives the encrypted uplink packet, if the base station cannot identify user plane network element information identified by the UCLSI2, the base station sends, to the SM function entity, a user plane network element request that carries the UCLSI2. Correspondingly, the SM function entity sends an identifier of the user plane network element 2 corresponding to the UCLSI2 to the base station through forwarding. In this way, the base station may send the encrypted uplink packet to the user plane network element 2 based on the identifier of the user plane network element 2.

S321. The user plane network element 2 obtains a context of the second session based on the UCSI2.

The UCLSI2 is used to identify the second session.

Optionally, if the user plane network element 2 does not store the context of the second session, the user plane network element 2 requests to obtain the context of the second session from the SM function entity. Herein, the context of the second session includes a security context, and the security context includes encryption algorithm information, decryption algorithm information, or the like of the session.

S322. The user plane network element 2 performs, based on the key information, integrity authentication on the packet received by the user plane network element 2, and decrypts the uplink packet.

S323. The user plane network element 2 forwards the decrypted uplink packet based on target address information in the decrypted uplink packet.

After the SM function entity receives the response message that is sent by the user plane network element 2 and that carries the target encryption algorithm information, the SM function entity may further send a second notification message to the user plane network element 1, to instruct the user plane network element 1 to release the context of the first session, thereby reducing resource waste of the user plane network element 1.

As shown in FIG. 3A, FIG. 3B, FIG. 3C, and FIG. 3D, after S314, the session migration method provided in this embodiment of this application further includes S324 and S325.

S324. The SM function entity sends a second notification message to the user plane network element 1, to instruct the user plane network element 1 to release the context of the first session.

Optionally, the SM function entity immediately sends the second notification message to the user plane network element 1 after receiving the response message in S314.

Optionally, after receiving the response message in S314, the SM function entity starts an internal timer of the SM function entity, and sends the second notification message to the user plane network element 1 when the timer exceeds a preset time.

S325. The user plane network element 1 releases the context of the first session.

Optionally, the context of the first session that is retained by the user plane network element 1 may alternatively be automatically aged and deleted.

It may be learned from the foregoing description that in the embodiments of this application, there is also an application scenario in which the downlink data to be sent to the terminal device triggers the user plane network element not to continue to provide a service for the terminal device. In the embodiments of this application, FIG. 4A, FIG. 4B, FIG. 4C, and FIG. 4D show a procedure in the application scenario.

Referring to FIG. 4A, FIG. 4B, FIG. 4C, and FIG. 4D, a session migration method according to an embodiment of this application includes the following steps.

S401. In a scenario in which a first session is established between a terminal device and a user plane network element 1, the user plane network element 1 determines whether to continue to provide a service for the terminal device.

As shown in FIG. 4A, FIG. 4B, FIG. 4C, and FIG. 4D, after the first session is established between the terminal device and the user plane network element 1, uplink data from the terminal device is transmitted along the terminal device→a base station→the user plane network element 1. Correspondingly, downlink data to be sent to the terminal device is transmitted along the user plane network element 1→the base station→the terminal device.

In a data transmission process, the user plane network element 1 determines whether a data transmission path currently used to transmit data from the terminal device meets a preset condition (the preset condition may be whether a quantity of hops of a data transmission path is greater than or equal to a preset quantity of hops), so as to determine whether to continue to provide a service for the terminal device. Alternatively, the user plane network element 1 determines whether a data volume of downlink data that is received by the user plane network element 1 within a preset time period and that is to be sent to the terminal device is greater than or equal to a preset threshold, so as to determine, based on a determining result, whether to continue to provide a service for the terminal device. The preset time period herein is any time period with preset duration.

Optionally, if the user plane network element 1 determines that a quantity of hops of the data transmission path currently used to transmit the data of the terminal device is greater than or equal to the preset quantity of hops, the user plane network element 1 determines not to continue to provide a service for the terminal device. Otherwise, the user plane network element 1 determines to continue to provide a service for the terminal device.

Optionally, if the user plane network element 1 determines that the data volume of the downlink data that is received by the user plane network element 1 within the preset time period and that is to be sent to the terminal device is greater than or equal to the preset threshold, the user plane network element 1 determines not to continue to provide a service for the terminal device. Otherwise, the user plane network element 1 determines to continue to provide a service for the terminal device.

S402. If the user plane network element 1 determines not to continue to provide a service for the terminal device, the user plane network element 1 retains a context of the first session, and sends a first notification message to an SM function entity.

The first notification message carries first information, a temporary ID1, and a UCLSI1. The first information is used to indicate that the user plane network element 1 no longer continues to provide a service for the terminal device.

S403. The SM function entity determines instruction information after receiving the first notification message.

The SM function entity determines the instruction information based on session management subscription data of the terminal device after receiving the first notification message. The instruction information is used to instruct the terminal device to immediately send a session establishment request to a control plane network element after the instruction information is obtained, to trigger establishment of a second session.

It is easily understood that the user plane network element 1 determines not to continue to provide a service for the terminal device when a data volume of downlink data that is received by the user plane network element 1 within a time period and that is to be sent to the terminal device is greater than or equal to the preset threshold. In addition, when the SM function entity obtains the first notification message, the user plane network element 1 has determined not to continue to provide a service for the terminal device. In this scenario, the second session needs to be immediately established, so as to transmit, based on the second session, downlink data to be sent to the terminal device.

S404. The SM function entity sends, to an MM function entity, a third notification message that carries the instruction information and a UCLSI1.

The MM function entity sends the third notification message to the terminal device after receiving the third notification message. Optionally, the session migration method provided in this embodiment of this application is applicable to a wireless communications system in which there is a small packet service, and data transmission frequency in the wireless communications system is relatively low. Therefore, the terminal device may be in an idle mode, or may be in a connected mode. If the terminal device is in the idle mode, S405 and S406 are performed after S404, and S407 is performed after S406. If the terminal device is in the connected mode, S407 is performed after S404. S405 and S406 are optional, and therefore are represented by using dashed lines in FIG. 4A, FIG. 4B, FIG. 4C, and FIG. 4D.

S405. The MM function entity sends a paging message to the terminal device.

S406. The terminal device sends a paging response to the MM function entity.

S407. The MM function entity forwards the third notification message in S404 to a base station.

S408. The base station forwards the third notification message in S407 to the terminal device.

The terminal device may learn, based on the instruction information in the third notification message, when to send the session establishment request to the control plane network element, and learn, based on the UCLSI1 in the third notification message, a specific session on which migration is performed.

S409. The terminal device sends, to the base station based on the instruction information carried in the third notification message received by the terminal device in S408, a session establishment request that carries encryption algorithm information.

S410. The base station forwards the session establishment request in S409 to the MM function entity.

S411. The MM function entity forwards the session establishment request to the SM function entity.

S412. After receiving the session establishment request, the SM function entity selects a user plane network element 2 for the terminal device, and allocates a UCLSI2 to the terminal device.

S413. The SM function entity sends a request message to the user plane network element 2, to request to allocate a user plane resource to a second session.

The request message carries the encryption algorithm information and an identifier of the base station.

S414. The user plane network element 2 sends, to the SM function entity, a response message that carries target encryption algorithm information.

The target encryption algorithm information is used to indicate an encryption algorithm used for the second session.

S415. The SM function entity sends, to the MM function entity, a session establishment response that carries the target encryption algorithm information and the UCLSI2, the MM function entity forwards the session establishment response to the base station, and the base station forwards the session establishment response to the terminal device.

A process of establishing the second session ends after the terminal device receives the session establishment response. In this way, uplink data from the terminal device is transmitted along the terminal device→the base station→the user plane network element 2. Correspondingly, downlink data to be sent to the terminal device is transmitted along the user plane network element 2→the base station→the terminal device.

Further, a session migration process in this embodiment is triggered by the downlink data to be sent to the terminal device. Therefore, after S415 in this embodiment, the terminal device further sends an uplink registration packet to the user plane network element 2. The uplink registration packet is used to instruct the user plane network element 2 to instruct an application server to update a downlink transmission path, and the downlink transmission path is a path used to transmit the downlink data to be sent to the terminal device.

As shown in FIG. 4A, FIG. 4B, FIG. 4C, and FIG. 4D, after S415, the method further includes:

S416. The terminal device sends an uplink registration packet to the base station, the base station forwards the uplink registration packet to the user plane network element 2, and the user plane network element 2 forwards the uplink registration packet to an application server.

S417. After receiving the uplink registration packet, the application server updates a path that is stored by the application server and that is used to forward downlink data to be sent to the terminal device.

Further, after the second session is established, data from the terminal device may be transmitted based on the second session. In the embodiment shown in FIG. 4A, FIG. 4B, FIG. 4C, and FIG. 4D, transmission of the uplink data from the terminal device is used as an example for description. The uplink data from the terminal device is embodied in a form of an uplink packet. Specifically, after S415, a transmission process of the uplink data from the terminal device is as follows:

S418. The terminal device calculates security key information based on the target encryption algorithm information in the session establishment response in S415.

S419. The terminal device adds the UCLSI2 and a signature used for integrity protection to a packet header of a to-be-transmitted uplink packet, and encrypts the to-be-transmitted uplink packet.

S420. The terminal device sends the encrypted uplink packet to the base station.

S421. The base station sends an acknowledgement message to the terminal device.

S422. The base station sends the encrypted data packet to the user plane network element 2.

Optionally, after the base station receives the encrypted uplink packet, if the base station can identify the UCLSI2, the base station selects the corresponding user plane network element 2 based on user plane network element information identified by the UCLSI2, and sends the encrypted uplink packet to the user plane network element 2.

Optionally, after the base station receives the encrypted uplink packet, if the base station cannot identify user plane network element information identified by the UCLSI2, the base station sends, to the SM function entity, a user plane network element request that carries the UCLSI2. Correspondingly, the SM function entity sends an identifier of the user plane network element 2 corresponding to the UCLSI2. In this way, the base station may send the encrypted uplink packet to the user plane network element 2 based on the identifier of the user plane network element 2.

S423. The user plane network element 2 obtains a context of the second session based on the UCSI2.

The UCSI2 is used to identify the second session.

Optionally, if the user plane network element 2 does not store the context of the second session, the user plane network element 2 requests to obtain the context of the second session from the SM function entity. Herein, the context of the second session includes a security context, and the security context includes encryption algorithm information, decryption algorithm information, or the like of the session.

S424. The user plane network element 2 performs, based on the key information, integrity authentication on the packet received by the user plane network element 2, and decrypts the uplink packet.

S425. The user plane network element 2 forwards the decrypted uplink packet based on target address information in the decrypted uplink packet.

For S418 to S425, refer to the description in S316 to S323 in FIG. 3A, FIG. 3B, FIG. 3C, and FIG. 3D. Details are not described herein again.

After the SM function entity receives the response message that is sent by the user plane network element 2 and that carries the target encryption algorithm information, the SM function entity may further send a second notification message to the user plane network element 1, to instruct the user plane network element 1 to release the context of the first session, thereby reducing resource waste of the user plane network element 1.

As shown in FIG. 4A, FIG. 4B, FIG. 4C, and FIG. 4D, after S414, the session migration method provided in this embodiment of this application further includes S426 and S427.

S426. The SM function entity sends a second notification message to the user plane network element 1, to instruct the user plane network element 1 to release the context of the first session.

Optionally, the SM function entity immediately sends the second notification message to the user plane network element 1 after receiving the response message in S414.

Optionally, after receiving the response message in S414, the SM function entity starts an internal timer of the SM function entity, and sends the second notification message to the user plane network element 1 when the timer exceeds a preset time.

S427. The user plane network element 1 releases the context of the first session.

Optionally, the context of the first session that is retained by the user plane network element 1 may alternatively be automatically aged and deleted.

For S426 and S427, refer to the description in S324 and S325 in FIG. 3A, FIG. 3B, FIG. 3C, and FIG. 3D. Details are not described herein again.

The procedure in the embodiment shown in FIG. 4A, FIG. 4B, FIG. 4C, and FIG. 4D is basically similar to the procedure in the embodiment shown in FIG. 3A, FIG. 3B, FIG. 3C, and FIG. 3D. A difference is that in the embodiment shown in FIG. 4A, FIG. 4B, FIG. 4C, and FIG. 4D, the downlink data to be sent to the terminal device triggers the user plane network element 1 to determine whether to continue to provide a service for the terminal device, but in the embodiment shown in FIG. 3A, FIG. 3B, FIG. 3C, and FIG. 3D, the uplink data triggers the user plane network element 1 to determine whether to continue to provide a service for the terminal device.

It may be learned from the foregoing description that the MM function entity and the SM function entity may be independently disposed, or may be integrated into a same device. In the embodiment shown in FIG. 3A, FIG. 3B, FIG. 3C, and FIG. 3D or FIG. 4A, FIG. 4B, FIG. 4C, and FIG. 4D, an example in which the MM function entity and the SM function entity are independently disposed is used for description. In a scenario in which the MM function entity and the SM function entity are integrated into a same device, for the session migration method provided in the embodiments of this application, refer to the embodiment shown in FIG. 3A, FIG. 3B, FIG. 3C, and FIG. 3D or FIG. 4A, FIG. 4B, FIG. 4C, and FIG. 4D. Details are not described herein again. A difference from the embodiment shown in FIG. 3A, FIG. 3B, FIG. 3C, and FIG. 3D or FIG. 4A, FIG. 4B, FIG. 4C, and FIG. 4D is that in the scenario in which the MM function entity and the SM function entity are integrated into a same device, there is no communication between the MM function entity and the SM function entity, and communication between the SM function entity and a user plane network element (the user plane network element 1 or the user plane network element 2) is communication between the control plane network element and the user plane network element.

In conclusion, in the embodiments of this application, the user plane network element 1 retains the context of the first session before the second session is established. Therefore, even if there is downlink data to be sent to the terminal device, the downlink data can also be accurately sent to the terminal device, thereby ensuring that no packet loss occurs in the downlink data. In addition, the second session is established through triggering when the terminal device needs to transmit data. Therefore, a case in which the second session is established while no data is transmitted does not occur. In this way, waste of core network resources is reduced, and unnecessary signaling transmission is also reduced.

An embodiment of this application provides a user plane network element. The user plane network element is configured to perform the steps performed by the source user plane network element in the foregoing session migration method. The user plane network element provided in this embodiment of this application may include modules corresponding to the corresponding steps.

In this embodiment of this application, the user plane network element may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example, and is merely logical function division. In actual implementation, there may be another division manner.

Figure 5:
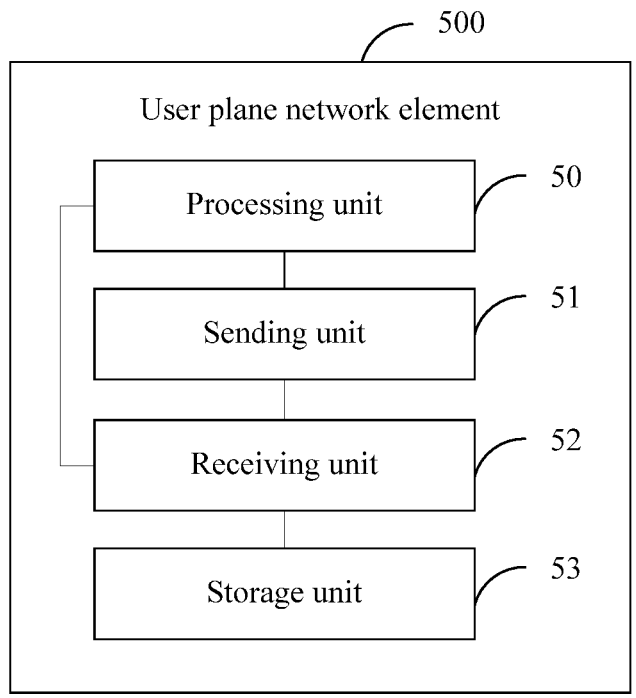
FIG. 5 is a first schematic structural diagram of a user plane network element according to an embodiment of this application.

When each function module is obtained through division based on each corresponding function, FIG. 5 is a possible schematic structural diagram of the user plane network element in the foregoing embodiment. As shown in FIG. 5, the user plane network element 500 includes a processing unit 50, a sending unit 51, and a receiving unit 52. The processing unit 50 is configured to support the user plane network element 500 in performing S201, S202, S206, S301, S302, S325, 8401, S402, 8427, and the like in the foregoing embodiments, and/or is used in another process of the technology described in this specification. The sending unit 51 is configured to support the user plane network element 500 in performing S202, S302, S402, and the like in the foregoing embodiments, and/or is used in another process of the technology described in this specification. The receiving unit 52 is configured to support the user plane network element 500 in performing S205, S324, S426, and the like in the foregoing embodiments, and/or is used in another process of the technology described in this specification. All content related to each step in the foregoing method embodiments may be cited in function description of a corresponding function module. Details are not described herein again. Certainly, the user plane network element 500 provided in this embodiment of this application includes but is not limited to the foregoing modules. For example, the user plane network element 500 may further include a storage unit 53. The storage unit 53 may be configured to store a context of a first session, and may be further configured to store program code and data of the user plane network element.

When an integrated unit is used, the processing unit 50 in this embodiment of this application may be a processor or a controller, for example, may be a central processing unit (CPU), or a digital signal processor (DSP). The processing unit 50 may implement or execute various example logical blocks, modules, and circuits described with reference to content disclosed in this application. Alternatively, the processing unit 50 may be a combination that implements a computation function, for example, a combination that includes one or more microprocessors, or a combination of a DSP and a microprocessor. The sending unit 51 and the receiving unit 52 may be integrated into one communications unit for implementation. The communications unit may be a communications interface. The storage unit 53 may be a memory.

Figure 6:
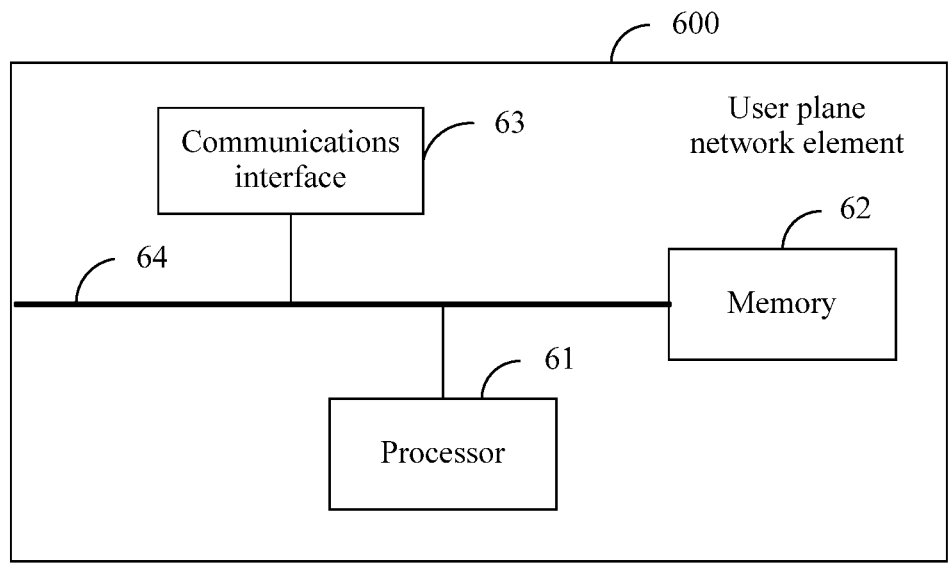
FIG. 6 is a second schematic structural diagram of a user plane network element according to an embodiment of this application.

When the processing unit is a processor, the storage unit is a memory, and the communications unit is a communications interface, the user plane network element 500 in this embodiment of this application may be a user plane network element 600 shown in FIG. 6. As shown in FIG. 6, the user plane network element 600 includes a processor 61, a memory 62, and a communications interface 63. The processor 61, the memory 62, and the communications interface 63 are connected to each other by using a bus 64.

The bus 64 may be an industry standard architecture (ISA) bus, a peripheral component interconnect (PCI) bus, an extended industry standard architecture (EISA) bus, or the like. The bus 64 may be classified into an address bus, a data bus, a control bus, and the like. For ease of representation, only one thick line is used to represent the bus in FIG. 6, but this does not mean that there is only one bus or only one type of bus.

For example, the user plane network element 600 may include one or more processors 61, in other words, the user plane network element 600 may include a multi-core processor.

When the user plane network element 600 runs, the user plane network element 600 performs the session migration method in the embodiment shown in any one of the accompanying drawings FIG. 2 to FIG. 4A, FIG. 4B, FIG. 4C, and FIG. 4D. For details about the session migration method, refer to the related description in the embodiment shown in any one of the accompanying drawings FIG. 2 to FIG. 4A, FIG. 4B, FIG. 4C, and FIG. 4D. Details are not described herein again.

Another embodiment of this application further provides a computer readable storage medium. The computer readable storage medium includes one or more pieces of program code. The one or more programs include instructions. When the processor 61 in the user plane network element 600 executes the program code, the user plane network element 600 performs the session migration method shown in any one of the accompanying drawings FIG. 2 to FIG. 4A, FIG. 4B, FIG. 4C, and FIG. 4D.

In another embodiment of this application, a computer program product is further provided. The computer program product includes a computer executable instruction, and the computer executable instruction is stored in a computer readable storage medium. At least one processor of a user plane network element may read the computer executable instruction from the computer readable storage medium, and the at least one processor executes the computer executable instruction, so that the user plane network element performs the steps performed by the source user plane network element in the session migration method shown in any one of the accompanying drawings FIG. 2 to FIG. 4A, FIG. 4B, FIG. 4C, and FIG. 4D.

An embodiment of this application provides a terminal device. The terminal device is configured to perform the steps performed by the terminal device in the foregoing session migration method. The terminal device provided in this embodiment of this application may include modules corresponding to the corresponding steps.

In this embodiment of this application, the terminal device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example, and is merely logical function division. In actual implementation, there may be another division manner.

Figure 7:
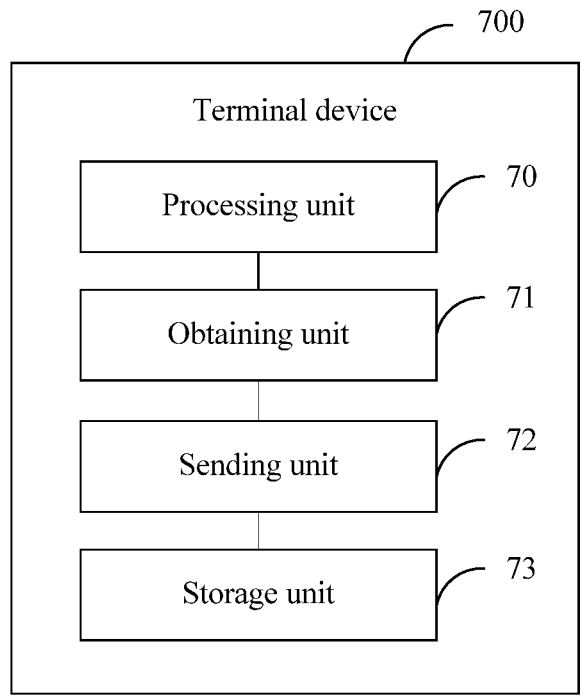
FIG. 7 is a first schematic structural diagram of a terminal device according to an embodiment of this application.

When each function module is obtained through division based on each corresponding function, FIG. 7 is a possible schematic structural diagram of the terminal device in the foregoing embodiment. As shown in FIG. 7, the terminal device 700 includes a processing unit 70, an obtaining unit 71, and a sending unit 72. The processing unit 70 is configured to support the terminal device 700 in establishing a first session with a user plane network element, and/or is used in another process of the technology described in this specification. The obtaining unit 71 is configured to support the terminal device 700 in performing S203, S305, S308, S315, S319, S405, S408, S415, S421, and the like in the foregoing embodiments, and/or is used in another process of the technology described in this specification. The sending unit 72 is configured to support the terminal device 700 in performing S204, S306, S309a, S309b, S318, S406, S409, S416, S420, and the like in the foregoing embodiments, and/or is used in another process of the technology described in this specification. All content related to each step in the foregoing method embodiments may be cited in function description of a corresponding function module. Details are not described herein again. Certainly, the terminal device 700 provided in this embodiment of this application includes but is not limited to the foregoing modules. For example, the terminal device 700 may further include a storage unit 73. The storage unit 73 may be configured to store program code and data of the terminal device.

When an integrated unit is used, the processing unit 70 in this embodiment of this application may be a processor or a controller, for example, may be a CPU or a DSP. The processing unit 70 may implement or execute various example logical blocks, modules, and circuits described with reference to content disclosed in this application. Alternatively, the processing unit 70 may be a combination that implements a computation function, for example, a combination that includes one or more microprocessors, or a combination of a DSP and a microprocessor. The obtaining unit 71 and the sending unit 72 may be integrated into one communications unit for implementation. The communications unit may be a communications interface. The storage unit 73 may be a memory.

Figure 8:
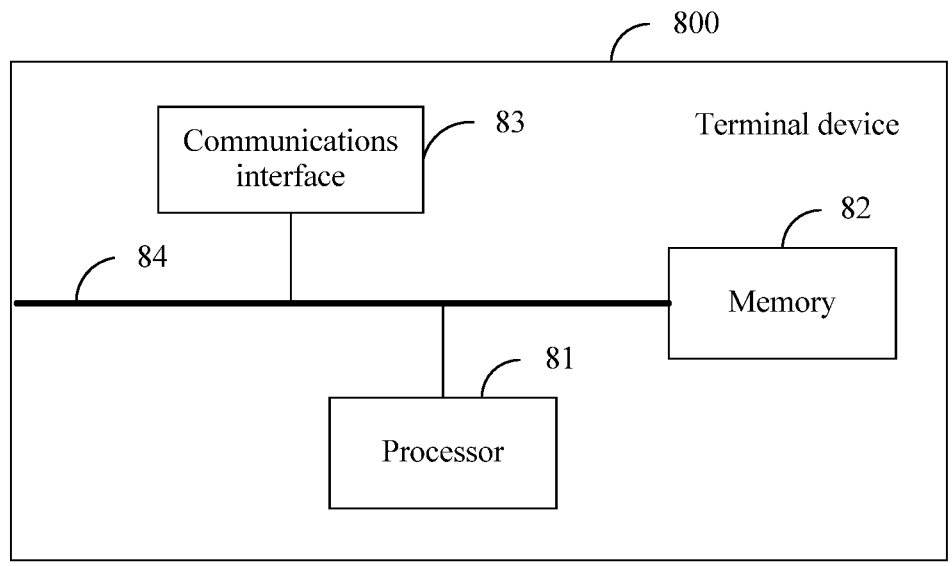
FIG. 8 is a second schematic structural diagram of a terminal device according to an embodiment of this application.

When the processing unit is a processor, the storage unit is a memory, and the communications unit is a communications interface, the terminal device 700 in this embodiment of this application may be a terminal device 800 shown in FIG. 8. As shown in FIG. 8, the terminal device 800 includes a processor 81, a memory 82, and a communications interface 83. The processor 81, the memory 82, and the communications interface 83 are connected to each other by using a bus 84.

The bus 84 may be a PCI bus, an EISA bus, or the like. The bus 84 may be classified into an address bus, a data bus, a control bus, and the like. For ease of representation, only one thick line is used to represent the bus in FIG. 8, but this does not mean that there is only one bus or only one type of bus.

For example, the terminal device 800 may include one or more processors 81, in other words, the terminal device 800 may include a multi-core processor.

When the terminal device 800 runs, the terminal device 800 performs the session migration method in the embodiment shown in any one of the accompanying drawings FIG. 2 to FIG. 4A, FIG. 4B, FIG. 4C, and FIG. 4D. For details about the session migration method, refer to the related description in the embodiment shown in any one of the accompanying drawings FIG. 2 to FIG. 4A, FIG. 4B, FIG. 4C, and FIG. 4D. Details are not described herein again.

Another embodiment of this application further provides a computer readable storage medium. The computer readable storage medium includes one or more pieces of program code. The one or more programs include instructions. When the processor 81 in the terminal device 800 executes the program code, the terminal device 800 performs the session migration method shown in any one of the accompanying drawings FIG. 2 to FIG. 4A, FIG. 4B, FIG. 4C, and FIG. 4D.

In another embodiment of this application, a computer program product is further provided. The computer program product includes a computer executable instruction, and the computer executable instruction is stored in a computer readable storage medium. At least one processor of a terminal device may read the computer executable instruction from the computer readable storage medium, and the at least one processor executes the computer executable instruction, so that the terminal device performs the steps performed by the terminal device in the session migration method shown in any one of the accompanying drawings FIG. 2 to FIG. 4A, FIG. 4B, FIG. 4C, and FIG. 4D.

An embodiment of this application provides a control plane network element. The control plane network element is configured to perform the steps performed by the target control plane network element in the foregoing session migration method. The control plane network element provided in this embodiment of this application may include modules corresponding to the corresponding steps.

In this embodiment of this application, the control plane network element may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example, and is merely logical function division. In actual implementation, there may be another division manner.

Figure 9:
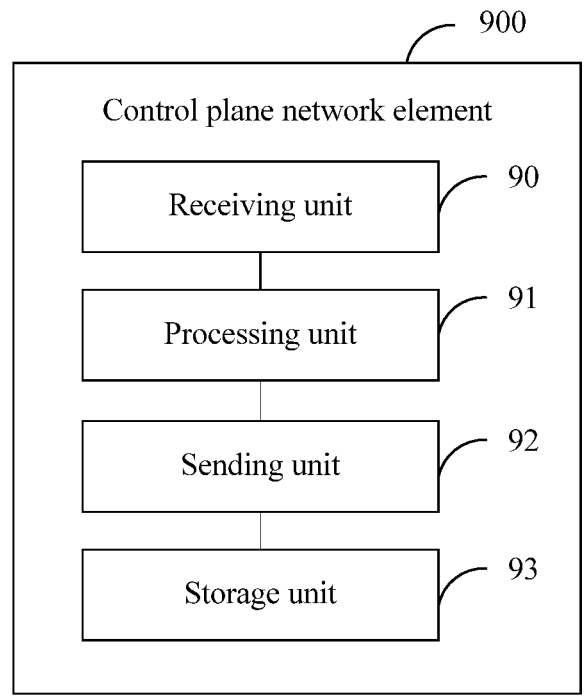
FIG. 9 is a first schematic structural diagram of a control plane network element according to an embodiment of this application.

When each function module is obtained through division based on each corresponding function, FIG. 9 is a possible schematic structural diagram of the control plane network element in the foregoing embodiment. As shown in FIG. 9, the control plane network element 900 includes a receiving unit 90, a processing unit 91, and a sending unit 92. The receiving unit 900 is configured to support the control plane network element 900 in performing S202, S204, S302, S306, S310, S314, S402, S406, S410, S414, and the like in the foregoing embodiments, and/or is used in another process of the technology described in this specification. The processing unit 91 is configured to support the control plane network element 900 in performing S203, S303, S312, S403, S412, and the like in the foregoing embodiments, and/or is used in another process of the technology described in this specification. The sending unit 92 is configured to support the control plane network element 900 in performing S205, S305, S313, S315, S324, S405, S413, S415, S424, and the like in the foregoing embodiments, and/or is used in another process of the technology described in this specification. All content related to each step in the foregoing method embodiments may be cited in function description of a corresponding function module. Details are not described herein again. Certainly, the control plane network element 900 provided in this embodiment of this application includes but is not limited to the foregoing modules. For example, the control plane network element goo may further include a storage unit 93. The storage unit 93 may be configured to store program code and data of the control plane network element.

When an integrated unit is used, the processing unit 91 in this embodiment of this application may be a processor or a controller, for example, may be a CPU or a DSP. The processing unit 91 may implement or execute various example logical blocks, modules, and circuits described with reference to content disclosed in this application. Alternatively, the processing unit 91 may be a combination that implements a computation function, for example, a combination that includes one or more microprocessors, or a combination of a DSP and a microprocessor. The obtaining unit 91 and the sending unit 92 may be integrated into one communications unit for implementation. The communications unit may be a communications interface. The storage unit 93 may be a memory.

Figure 10:
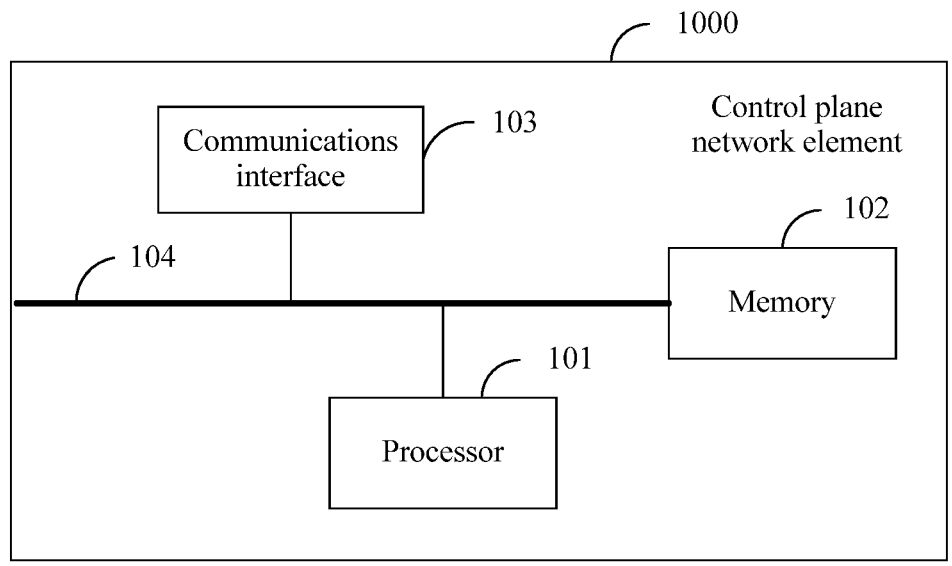
FIG. 10 is a second schematic structural diagram of a control plane network element according to an embodiment of this application.

When the processing unit is a processor, the storage unit is a memory, and the communications unit is a communications interface, the control plane network element 900 in this embodiment of this application may be a control plane network element 1000 shown in FIG. 10. As shown in FIG. 10, the control plane network element 1000 includes a processor 101, a memory 102, and a communications interface 103. The processor 10, the memory 102, and the communications interface 103 are connected to each other by using a bus 104.

The bus 104 may be a PCI bus, an EISA bus, or the like. The bus 104 may be classified into an address bus, a data bus, a control bus, and the like. For ease of representation, only one thick line is used to represent the bus in FIG. 10, but this does not mean that there is only one bus or only one type of bus.

For example, the control plane network element 1000 may include one or more processors 101, in other words, the control plane network element 1000 may include a multi-core processor.

When the control plane network element 1000 runs, the control plane network element 1000 performs the session migration method in the embodiment shown in any one of the accompanying drawings FIG. 2 to FIG. 4A, FIG. 4B, FIG. 4C, and FIG. 4D. For details about the session migration method, refer to the related description in the embodiment shown in any one of the accompanying drawings FIG. 2 to FIG. 4A, FIG. 4B, FIG. 4C, and FIG. 4D. Details are not described herein again.

Another embodiment of this application further provides a computer readable storage medium. The computer readable storage medium includes one or more pieces of program code. The one or more programs include instructions. When the processor 101 in the control plane network element 1000 executes the program code, the control plane network element 1000 performs the session migration method shown in any one of the accompanying drawings FIG. 2 to FIG. 4A, FIG. 4B, FIG. 4C, and FIG. 4D.

In another embodiment of this application, a computer program product is further provided. The computer program product includes a computer executable instruction, and the computer executable instruction is stored in a computer readable storage medium. At least one processor of a control plane network element may read the computer executable instruction from the computer readable storage medium, and the at least one processor executes the computer executable instruction, so that the control plane network element performs the steps performed by the control plane network element in the session migration method shown in any one of the accompanying drawings FIG. 2 to FIG. 4A, FIG. 4B, FIG. 4C, and FIG. 4D.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A session migration method comprising:
   determining, by a source user plane network element, whether to continue to provide a service for a terminal device; and
   in response to determining not to continue to provide a service for the terminal device, retaining, by the source user plane network element, a context of a first session, and sending a first notification message to a control plane network element, wherein:
      the first notification message comprises session management subscription data and frequency information that indicates a data sending frequency of the terminal device;
      the first notification message is used to trigger the control plane network element to send instruction information to the terminal device, and the instruction information is used to instruct the terminal device when to send to the control plane network element a session establishment request that is used to trigger establishment of a second session based on the frequency information;
      the first session is an established session between the source user plane network element and the terminal and device; and
      the second session is a session between a target user plane network element and the terminal device.

2. The session migration method according to claim 1, further comprising:
   receiving, by the source user plane network element, a second notification message from the control plane network element after the source user plane network element sends the first notification message to the control plane network element; and
   releasing, by the source user plane network element, the context of the first session after receiving the second notification message.

3. The session migration method according to claim 1, wherein determining whether to continue comprises:
   determining, by the source user plane network element based on a first condition, whether to continue to provide a service for the terminal device, wherein the first condition comprises that a data volume of uplink data received by the source user plane network element within a preset time period is greater than or equal to a preset threshold.

4. The session migration method according to claim 1, wherein using the instruction information to instruct the terminal device when to send a session establishment request to the control plane network element that is used to trigger establishment of a second session based on the frequency information further comprises comparing the data sending frequency of the terminal device and a preset frequency.

5. The session migration method according to claim 4, wherein comparing the data sending frequency of the terminal device and a preset frequency indicates that the data sending frequency of the terminal device is less than the preset frequency and the instruction information is used to instruct the terminal device to send the session establishment request to the control plane network element after the terminal device obtains data to be sent to the terminal device.

6. The session migration method according to claim 4, wherein comparing the data sending frequency of the terminal device and a preset frequency indicates that the data sending frequency of the terminal device is greater than the preset frequency and the instruction information is used to instruct the terminal device to send the session establishment request to the control plane network element immediately after receiving the instruction information.

7. The session migration method according to claim 1, wherein the terminal device is in idle mode and a paging message is sent from the control plane network element to the terminal device prior to the control plane network element sending the instruction information to the terminal device.

8. The session migration method according to claim 7, further comprising sending, by the terminal device, a paging response in response to receiving the paging message prior to the control plane network element sending the instruction information to the terminal device.

9. The session migration method according to claim 1, wherein the session establishment request further includes encryption algorithm information, the encryption algorithm information comprising at least one encryption algorithm supported by the terminal device.

10. A session migration method comprising:
    establishing, by a terminal device, a first session with a source user plane network element;
    obtaining, by the terminal device, instruction information sent by a control plane network element, wherein the instruction information is used to instruct the terminal device when to send a session establishment request to the control plane network element; and
    sending, by the terminal device, the session establishment request to the control plane network element based on the instruction information, to trigger establishment of a second session, wherein the second session is a session between a target user plane network element and the terminal device.

11. The session migration method according to claim 10, further comprising:
    sending, by the terminal device, an uplink registration packet to the target user plane network element, wherein the uplink registration packet is used to instruct the target user plane network element to instruct an application server to update a downlink transmission path, and the downlink transmission path is a path used to transmit downlink data to be sent to the terminal device.

12. The session migration method according to claim 10, wherein establishing, by a terminal device, a first session with the source user plane network element further indicates that the control plane network element obtains subscription data of the terminal device from a user data management (UDM) device, performs authentication and authorization for the terminal device based on subscription data of the terminal device, allocates a temporary ID to the terminal device, selects the source user plane network element for the terminal device, allocates a user plane gateway connectionless identifier (UCLSI), and allocates an IP address to the terminal device.

13. The session migration method according to claim 10, wherein the instruction information is used to instruct the terminal device to send the session establishment request to the control plane network element immediately after receiving the instruction information.

14. The session migration method according to claim 10, wherein the terminal device is in idle mode and the session migration method further comprises:
sending, by the control plane network element, a paging message to the terminal device; and
sending, by the terminal device, a paging response in response to receiving the paging message, wherein the paging message sent by the control plane network element and the paging response sent by the terminal device are both sent prior to the control plane network element sending the instruction information to the terminal device.

15. A session migration method comprising:
receiving, by a control plane network element, a first notification message from a source user plane network element, the first notification message comprising session management subscription data and frequency information that indicates a data sending frequency of a terminal device; and
determining, by the control plane network element, instruction information after receiving the first notification message, and sending the instruction information to the terminal device, wherein the instruction information is used to instruct the terminal device when to send a session establishment request used to trigger establishment of a second session based on the frequency information, and the second session is a session between the terminal device and a target user plane network element.

16. The session migration method according to claim 15, further comprising:
sending, by the control plane network element, a second notification message to the source user plane network element after the second session is established, wherein the second notification message is used to instruct the source user plane network element to release a context of a first session, and the first session is a session established by the terminal device with the source user plane network element before the second session is established.

17. The session migration method according to claim 15, wherein using the instruction information to instruct the terminal device when to send a session establishment request to the control plane network element that is used to trigger establishment of a second session based on the frequency information further comprises comparing the data sending frequency of the terminal device and a preset frequency.

18. The session migration method according to claim 17, wherein comparing the data sending frequency of the terminal device and a preset frequency indicates that the data sending frequency of the terminal device is less than the preset frequency and the instruction information is used to instruct the terminal device to send the session establishment request to the control plane network element after the terminal device obtains data to be sent to the terminal device.

19. The session migration method according to claim 17, wherein the comparing the data sending frequency of the terminal device and a preset frequency indicates that the data sending frequency of the terminal device is greater than the preset frequency and the instruction information is used to instruct the terminal device to send the session establishment request to the control plane network element immediately after receiving the instruction information.

* * * * *

UNITED STATES PATENT AND TRADEMARK OFFICE
CERTIFICATE OF CORRECTION

PATENT NO.        : 11,089,520 B2                                         Page 1 of 1
APPLICATION NO.   : 16/577518
DATED             : August 10, 2021
INVENTOR(S)       : Fangyuan Zhu It is certified that error appears in the above-identified patent and that said Letters Patent is hereby corrected as shown below:

In the Claims

Claim 1, Column 29, Lines 37 and 38; delete "and" between "terminal and device".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*